United States Patent
Nachimuthu et al.

(10) Patent No.: US 11,184,261 B2
(45) Date of Patent: Nov. 23, 2021

(54) TECHNIQUES TO CONFIGURE PHYSICAL COMPUTE RESOURCES FOR WORKLOADS VIA CIRCUIT SWITCHING

(71) Applicant: INTEL CORPORATION, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 15/396,473

(22) Filed: Dec. 31, 2016

(65) Prior Publication Data

US 2018/0026908 A1    Jan. 25, 2018

Related U.S. Application Data

(60) Provisional application No. 62/427,268, filed on Nov. 29, 2016, provisional application No. 62/376,859, (Continued)

(51) Int. Cl.
*H04L 12/26* (2006.01)
*G06F 16/901* (2019.01)
(Continued)

(52) U.S. Cl.
CPC ............ *H04L 43/08* (2013.01); *G02B 6/3882* (2013.01); *G02B 6/3893* (2013.01); *G02B 6/3897* (2013.01); *G02B 6/4292* (2013.01); *G02B 6/4452* (2013.01); *G06F 1/183* (2013.01); *G06F 1/20* (2013.01); *G06F 3/064* (2013.01); *G06F 3/0613* (2013.01); *G06F 3/0625* (2013.01); *G06F 3/0653* (2013.01);
(Continued)

(58) Field of Classification Search
CPC ............... H04Q 11/0005; H04Q 11/00; H04Q 11/0071; H04Q 11/0003; H04Q 1/04; H04Q 11/0062; H04L 69/329; H04L 49/357; H04L 49/25; H04L 49/15; H04L 67/10; H04L 67/1012; H04L 47/782; H04L 41/12; H04L 41/5019; H04L 47/24; H04L 67/1004; H04L 67/1034; H04L 67/1097; H04L 67/16; G06F 13/4022; G06F 9/5072

See application file for complete search history.

(56) References Cited

U.S. PATENT DOCUMENTS 8,125,984 B2 * 2/2012 Giles ................... H04L 67/125
                                                            370/353
8,650,299 B1 * 2/2014 Huang ................. G06F 9/5077
                                                            709/226

(Continued)

OTHER PUBLICATIONS

International Search Report received for PCT Patent Application No. PCT/US2017/038672, dated Oct. 19, 2017, 3 pages.

*Primary Examiner* — Jimmy H Tran
(74) *Attorney, Agent, or Firm* — Compass IP Law PC

(57) ABSTRACT

Embodiments are generally directed apparatuses, methods, techniques and so forth to select two or more processing units of the plurality of processing units to process a workload, and configure a circuit switch to link the two or more processing units to process the workload, the two or more processing units each linked to each other via paths of communication and the circuit switch.

25 Claims, 19 Drawing Sheets

Related U.S. Application Data filed on Aug. 18, 2016, provisional application No. 62/365,969, filed on Jul. 22, 2016.

(51) Int. Cl.

| | |
|---|---|
| H04B 10/25 | (2013.01) |
| G02B 6/38 | (2006.01) |
| G02B 6/42 | (2006.01) |
| G02B 6/44 | (2006.01) |
| G06F 1/18 | (2006.01) |
| G06F 1/20 | (2006.01) |
| G06F 3/06 | (2006.01) |
| G06F 8/65 | (2018.01) |
| G06F 9/30 | (2018.01) |
| G06F 9/4401 | (2018.01) |
| G06F 9/54 | (2006.01) |
| G06F 12/109 | (2016.01) |
| G06F 12/14 | (2006.01) |
| G06F 13/16 | (2006.01) |
| G06F 13/40 | (2006.01) |
| G08C 17/02 | (2006.01) |
| G11C 5/02 | (2006.01) |
| G11C 7/10 | (2006.01) |
| G11C 11/56 | (2006.01) |
| G11C 14/00 | (2006.01) |
| H03M 7/30 | (2006.01) |
| H03M 7/40 | (2006.01) |
| H04L 12/24 | (2006.01) |
| H04L 12/931 | (2013.01) |
| H04L 12/947 | (2013.01) |
| H04L 29/08 | (2006.01) |
| H04L 29/06 | (2006.01) |
| H04Q 11/00 | (2006.01) |
| H05K 7/14 | (2006.01) |
| G06F 15/16 | (2006.01) |
| G06F 9/38 | (2018.01) |
| G06F 9/50 | (2006.01) |
| H04L 12/851 | (2013.01) |
| H04L 12/811 | (2013.01) |
| H05K 5/02 | (2006.01) |
| H04W 4/80 | (2018.01) |
| G06Q 10/08 | (2012.01) |
| G06Q 10/00 | (2012.01) |
| G06Q 50/04 | (2012.01) |
| H04J 14/00 | (2006.01) |
| H04L 12/911 | (2013.01) |
| B25J 15/00 | (2006.01) |
| B65G 1/04 | (2006.01) |
| H05K 7/20 | (2006.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |

(52) U.S. Cl.
CPC .......... *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01); *G06F 9/544* (2013.01); *G06F 12/109* (2013.01); *G06F 12/1408* (2013.01); *G06F 13/1668* (2013.01); *G06F 13/409* (2013.01); *G06F 13/4068* (2013.01); *G06F 15/161* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01); *H03M 7/3086* (2013.01); *H03M 7/4056* (2013.01); *H03M 7/4081* (2013.01); *H04B 10/25891* (2020.05); *H04L 41/145* (2013.01); *H04L 43/0817* (2013.01); *H04L 43/0876* (2013.01); *H04L 43/0894* (2013.01); *H04L 49/00* (2013.01); *H04L 49/25* (2013.01); *H04L 49/357* (2013.01); *H04L 49/45* (2013.01); *H04L 67/02* (2013.01); *H04L 67/306* (2013.01); *H04L 69/04* (2013.01); *H04L 69/329* (2013.01); *H04Q 11/0003* (2013.01); *H05K 7/1442* (2013.01); *B25J 15/0014* (2013.01); *B65G 1/0492* (2013.01); *G05D 23/1921* (2013.01); *G05D 23/2039* (2013.01); *G06F 3/061* (2013.01); *G06F 3/067* (2013.01); *G06F 3/0611* (2013.01); *G06F 3/0616* (2013.01); *G06F 3/0619* (2013.01); *G06F 3/0631* (2013.01); *G06F 3/0638* (2013.01); *G06F 3/0647* (2013.01); *G06F 3/0658* (2013.01); *G06F 3/0659* (2013.01); *G06F 9/3887* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 13/161* (2013.01); *G06F 13/1694* (2013.01); *G06F 13/4022* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/06* (2013.01); *G06Q 10/06314* (2013.01); *G06Q 10/087*

(2013.01); *G06Q 10/20* (2013.01); *G06Q 50/04* (2013.01); *G07C 5/008* (2013.01); *G08C 2200/00* (2013.01); *G11C 5/06* (2013.01); *H03M 7/30* (2013.01); *H03M 7/3084* (2013.01); *H03M 7/40* (2013.01); *H03M 7/4031* (2013.01); *H03M 7/6005* (2013.01); *H03M 7/6023* (2013.01); *H04B 10/25* (2013.01); *H04J 14/00* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/12* (2013.01); *H04L 41/147* (2013.01); *H04L 41/5019* (2013.01); *H04L 43/065* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/555* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/34* (2013.01); *H04Q 1/04* (2013.01); *H04Q 11/00* (2013.01); *H04Q 11/0005* (2013.01); *H04Q 11/0062* (2013.01); *H04Q 11/0071* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/023* (2013.01); *H04W 4/80* (2018.02); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1485* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *H05K 2201/066* (2013.01); *H05K 2201/10121* (2013.01); *H05K 2201/10159* (2013.01); *H05K 2201/10189* (2013.01); *Y02D 10/00* (2018.01); *Y02P 90/30* (2015.11); *Y04S 10/50* (2013.01); *Y04S 10/52* (2013.01); *Y10S 901/01* (2013.01)

(56) References Cited

U.S. PATENT DOCUMENTS

| | | | | |
|---|---|---|---|---|
| 8,954,698 | B2 * | 2/2015 | Schenfeld | G06F 12/0292 711/147 |
| 9,104,586 | B2 * | 8/2015 | Schenfeld | G06F 12/0292 |
| 9,184,845 | B1 * | 11/2015 | Vahdat | H04B 10/27 |
| 9,307,018 | B2 * | 4/2016 | DeCusatis | H04L 67/1008 |
| 9,811,281 | B2 * | 11/2017 | Bivens | G06F 3/0631 |
| 9,916,636 | B2 * | 3/2018 | Li | G06T 1/20 |
| 10,129,169 | B2 * | 11/2018 | Mahindru | H04L 47/70 |
| 10,231,036 | B1 * | 3/2019 | Ben-Itzhak | H04Q 11/0062 |
| 2002/0004913 | A1 * | 1/2002 | Fung | G06F 1/3221 713/300 |
| 2004/0078419 | A1 * | 4/2004 | Ferrari | H04L 29/06 709/201 |
| 2005/0060608 | A1 * | 3/2005 | Marchand | H04L 12/1877 714/18 |
| 2007/0044064 | A1 * | 2/2007 | Duller | G06F 8/451 716/116 |
| 2008/0301413 | A1 * | 12/2008 | Wang | G06F 9/30145 712/220 |
| 2009/0238178 | A1 * | 9/2009 | Giles | H04L 41/0816 370/360 |
| 2010/0042809 | A1 * | 2/2010 | Schenfeld | G06F 15/17343 712/29 |
| 2010/0306408 | A1 * | 12/2010 | Greenberg | H04L 12/4633 709/238 |
| 2011/0055844 | A1 * | 3/2011 | Nguyen | G06F 1/26 718/104 |
| 2011/0113219 | A1 * | 5/2011 | Golshan | G06F 9/44505 712/30 |
| 2011/0206381 | A1 * | 8/2011 | Ji | H04B 10/801 398/140 |
| 2012/0093035 | A1 * | 4/2012 | Kidambi | H04L 49/3054 370/255 |
| 2012/0102291 | A1 * | 4/2012 | Cherian | G06F 9/5044 711/170 |
| 2012/0192200 | A1 * | 7/2012 | Rao | G06F 9/4893 718/105 |
| 2013/0275703 | A1 * | 10/2013 | Schenfeld | G06F 12/0292 711/165 |
| 2014/0173015 | A1 * | 6/2014 | Agarwala | G06F 3/0619 709/212 |
| 2015/0074276 | A1 * | 3/2015 | DeCusatis | H04L 67/1008 709/226 |
| 2015/0271010 | A1 * | 9/2015 | Shetty | H04L 41/0803 709/220 |
| 2015/0381426 | A1 * | 12/2015 | Roese | G06F 9/5077 709/226 |
| 2016/0269228 | A1 * | 9/2016 | Franke | H04L 41/0886 |
| 2016/0306678 | A1 * | 10/2016 | Hira | G06F 9/5083 |
| 2017/0024453 | A1 * | 1/2017 | Raja | H04L 47/125 |
| 2017/0054603 | A1 * | 2/2017 | Kulkarni | H04L 41/0893 |
| 2017/0149931 | A1 * | 5/2017 | Lochhead | H04L 41/0896 |
| 2017/0293447 | A1 * | 10/2017 | Bivens | G06F 3/067 |
| 2017/0293994 | A1 * | 10/2017 | Li | G06T 1/20 |
| 2017/0295107 | A1 * | 10/2017 | Salapura | H04L 41/5025 |
| 2017/0295108 | A1 * | 10/2017 | Mahindru | H04L 47/70 |
| 2018/0007127 | A1 * | 1/2018 | Salapura | G06F 21/105 |
| 2018/0254241 | A1 * | 9/2018 | Ong | H01L 21/485 |
| 2018/0343208 | A1 * | 11/2018 | Narkier | H04L 47/70 |
| 2020/0364172 | A1 * | 11/2020 | Long | G06F 11/00 |
| 2021/0160318 | A1 * | 5/2021 | Sajeepa | G06F 3/0659 |

* cited by examiner

*600*

1200

Sled 1304

*Physical Compute Resources 1605-2*

US 11,184,261 B2

TECHNIQUES TO CONFIGURE PHYSICAL COMPUTE RESOURCES FOR WORKLOADS VIA CIRCUIT SWITCHING

RELATED CASES

This application claims priority to U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016, each of which are hereby incorporated by reference in their entirety.

TECHNICAL FIELD

Embodiments described herein generally include performing circuit switching for workloads.

BACKGROUND

A computing data center may include one or more computing systems including a plurality of compute nodes that may include various compute structures (e.g., servers or sleds) and may be physically located on multiple racks. The sleds may include a number of physical resources interconnected via one or more compute structures and buses.

Typically, a computing data center may include a management entity to distribute workloads among the compute structures located within the racks. However, the management entity may currently distribute the workloads in a manner such that physical resources may be underutilized. For example, a workload may be distributed for processing on physical resources including four computer processing units. However, the same workload may be processed in two computer processing units and still meet the requirements of the workload. In this example, two of the computer processing units may have been able to process a different workload in parallel. Thus, embodiments may be directed to intelligently partitioning the physical resources without reducing bandwidth for inter-processor communications and maintaining dual paths of communication.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
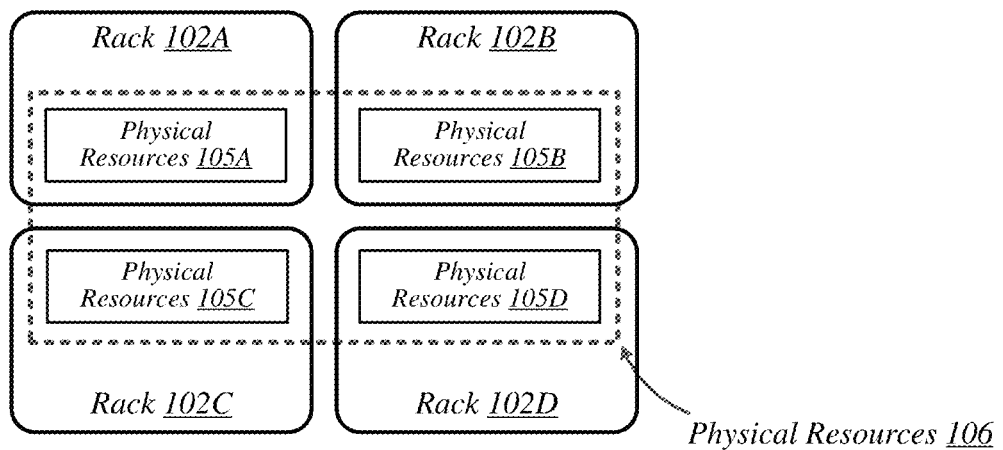
FIG. 1 illustrates an example of a data center.

Various embodiments may be generally directed to determining a number of processing units to process a workload. The determination may be based on one or more requirements for a workload to be processed by physical resources, such as processing units, memory, and input/output (I/O). In some instances, the determination may be based on a processing requirement for the workload, such as an indicated number of processing units and cores, memory requirements, I/O requirements, a service level agreement requirement for the workload, a time in which the workload must be completed, and so forth. In some instances, the number of processing units to process workloads may be provided to a switching controller or determined by the switching controller based on the requirements.

In embodiments, the switching controller may be processing circuitry capable of perform instructions stored in memory, the instructions may be switching logic to cause operations discussed herein. Moreover, the switching controller may configure a circuit switch to link or maintain a link between a number of the processing units to process the workload. Moreover, the links may maintain dual paths of communication between each of the processing units. In embodiments, the circuit switch may be an electrical circuit switch and the dual paths of communication may be electrical paths of communication. In the same or other embodiments, the circuit switch may be an optical circuit switch and the dual paths of communication may be optical paths of communication. Embodiments are not limited in this manner.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
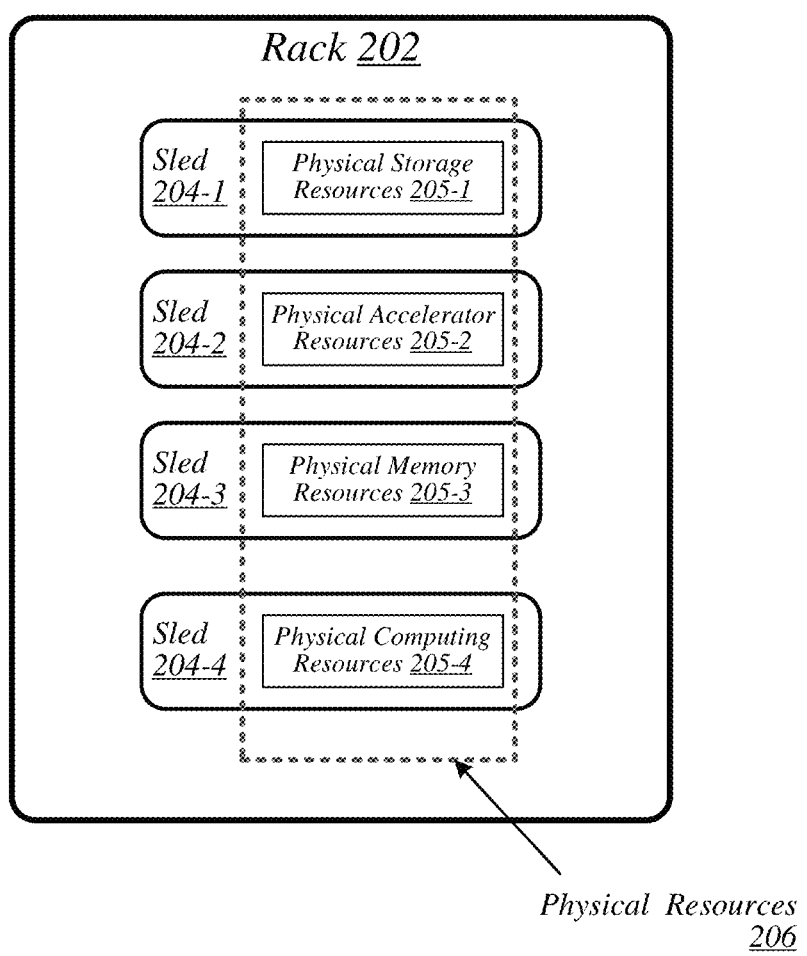
FIG. 2 illustrates an example of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
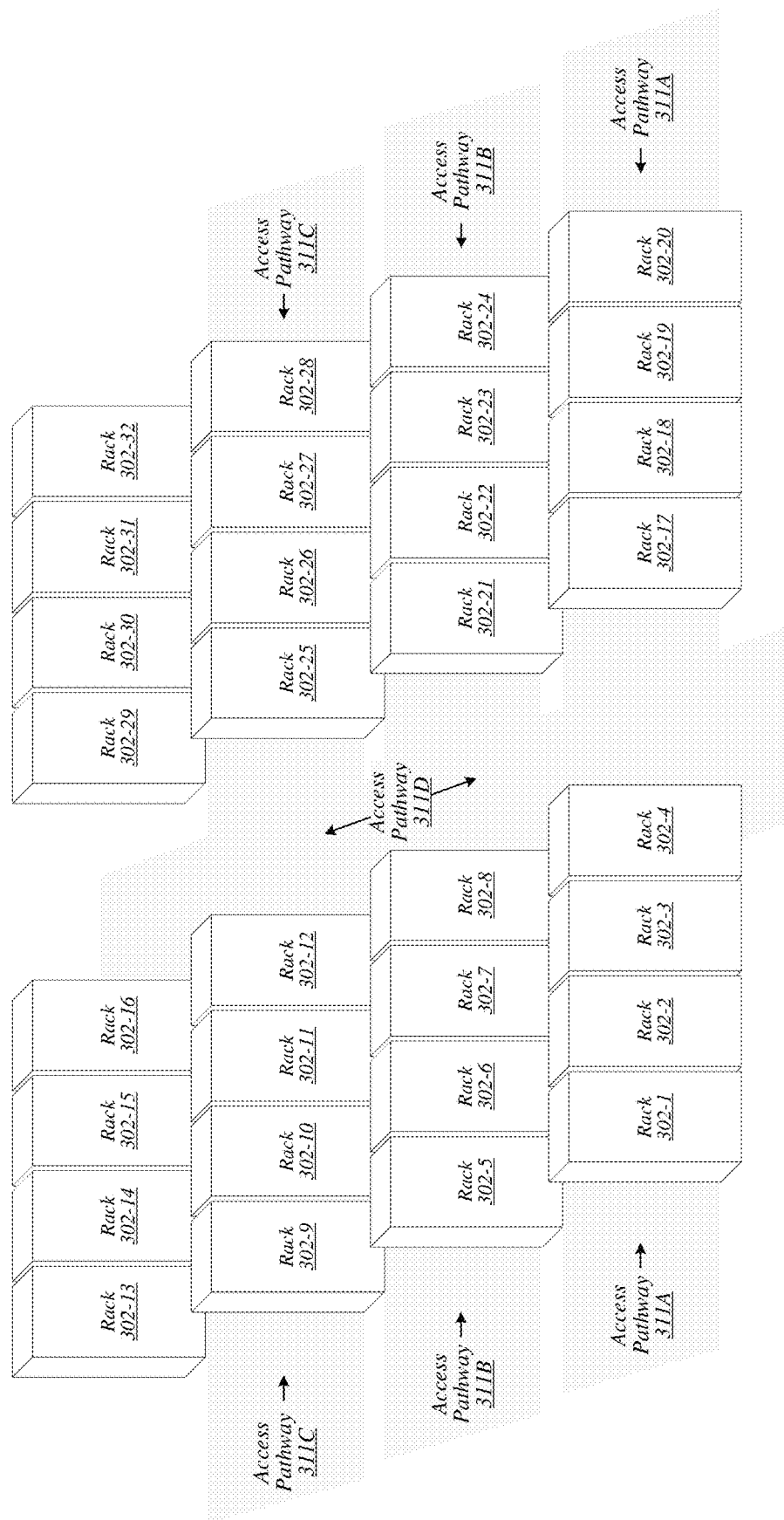
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
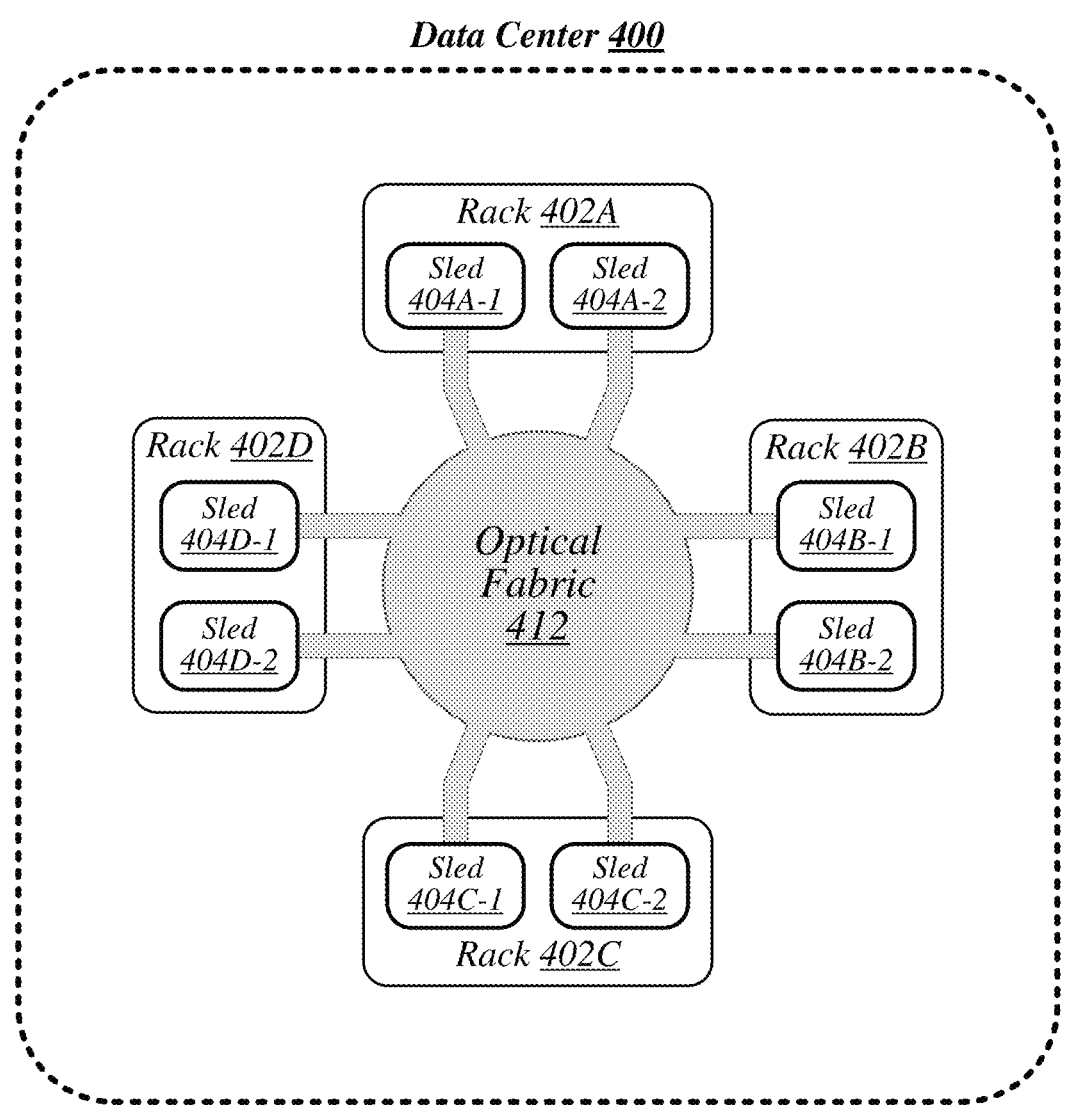
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
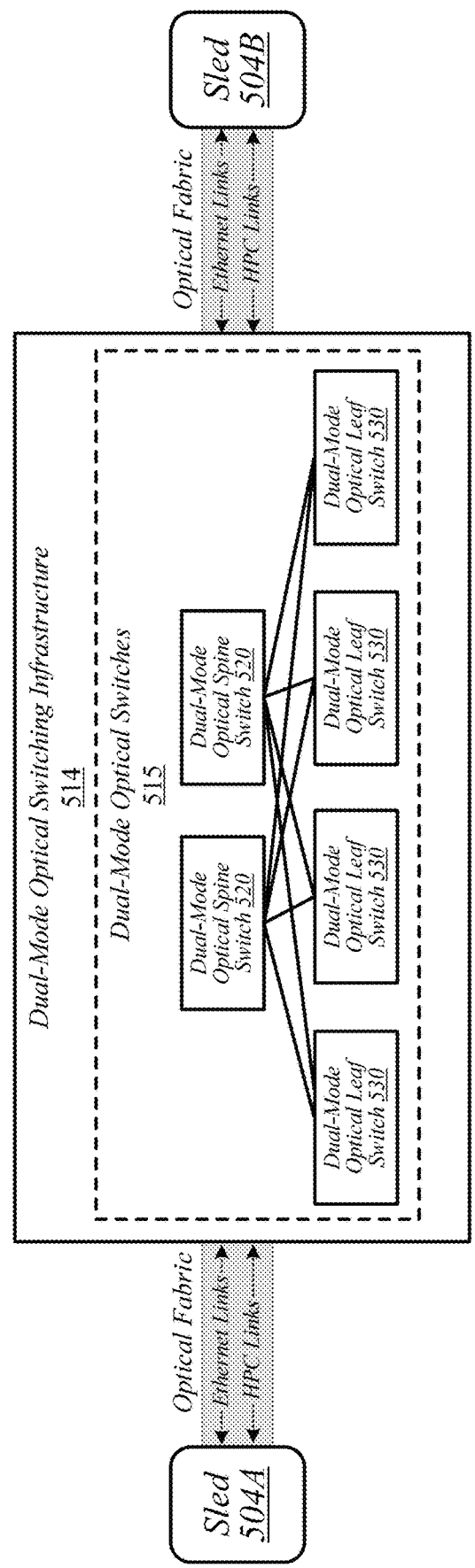
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
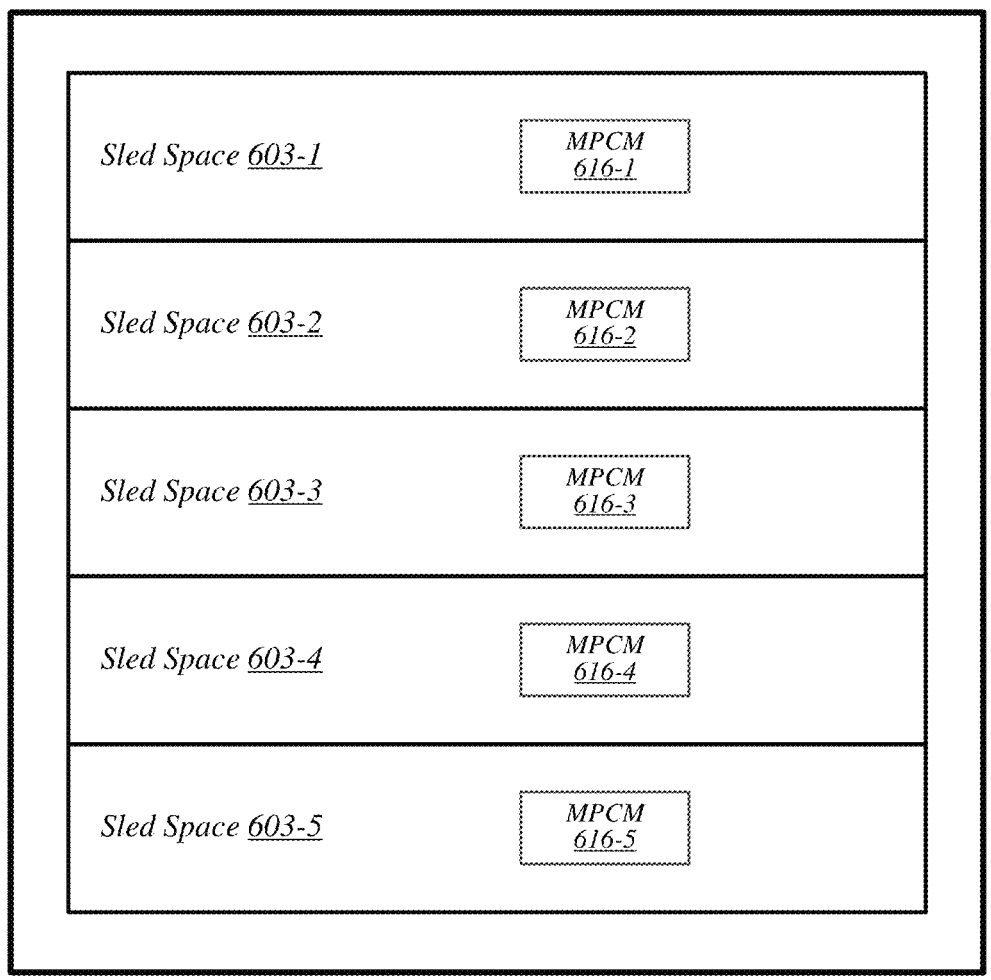
FIG. 6 illustrates an example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
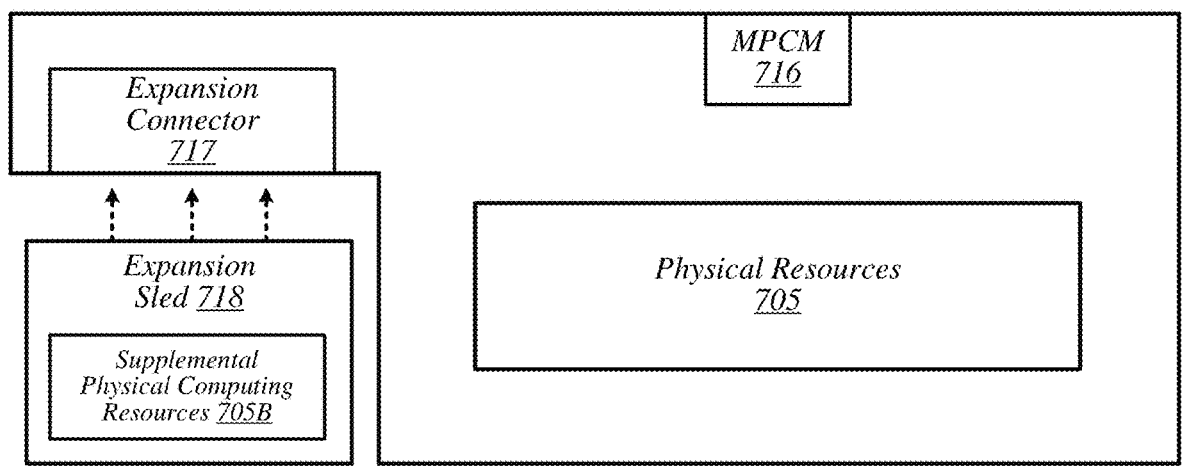
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
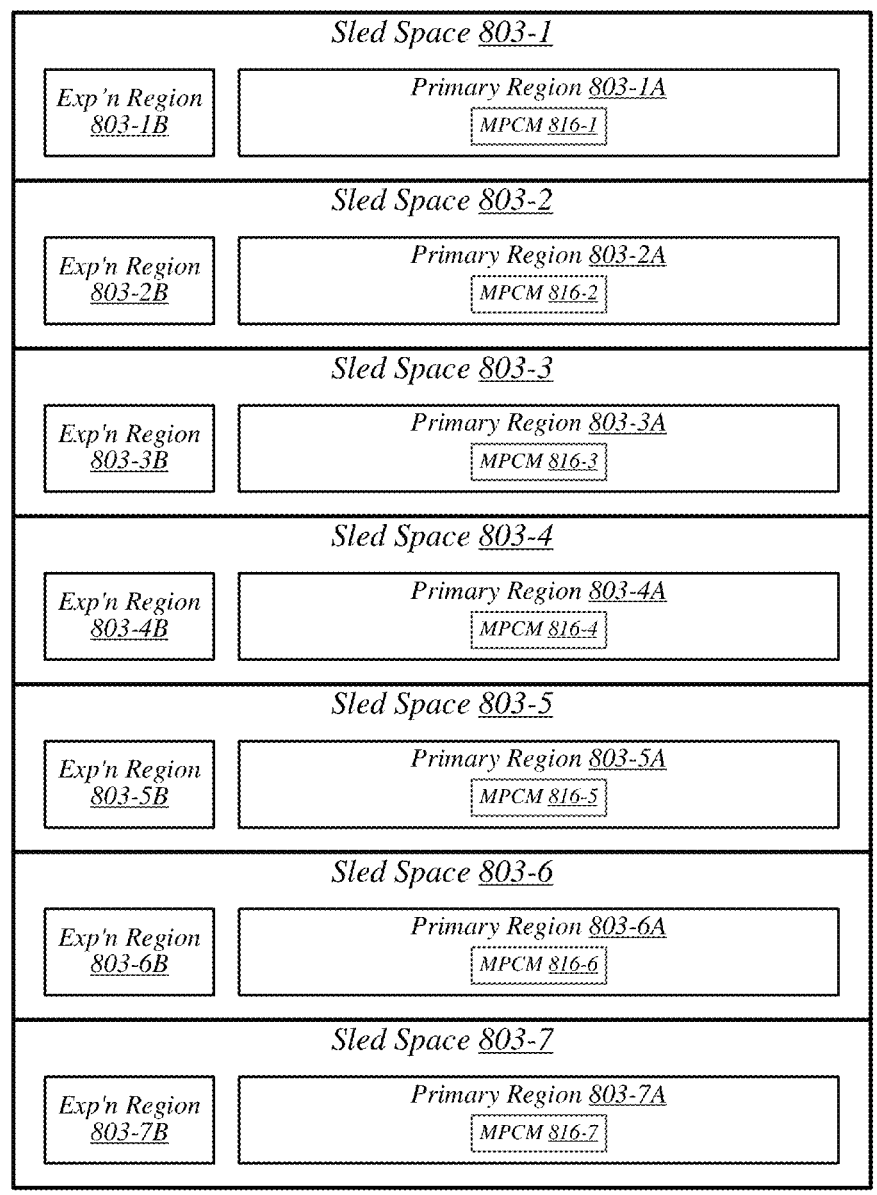
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
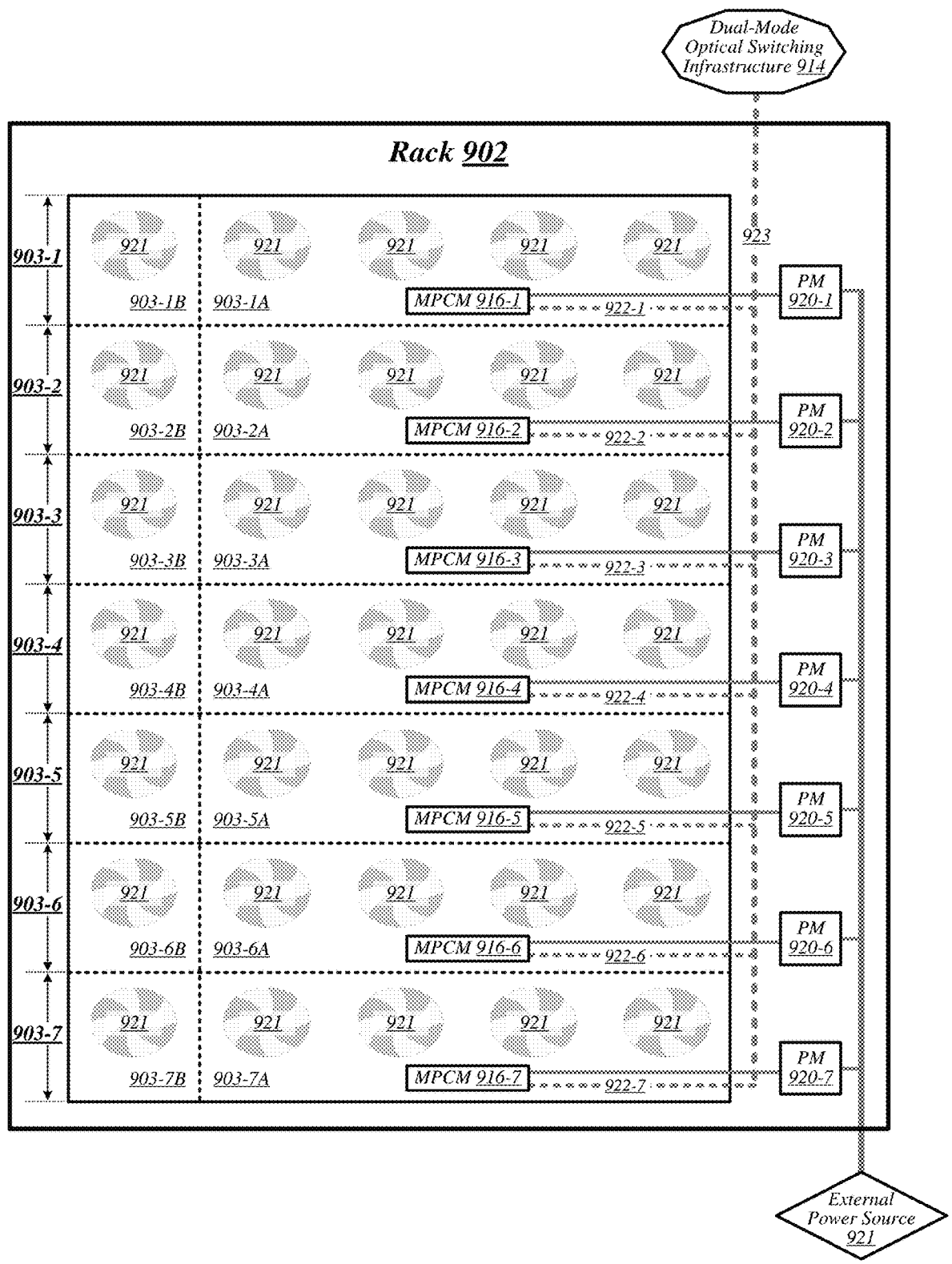
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
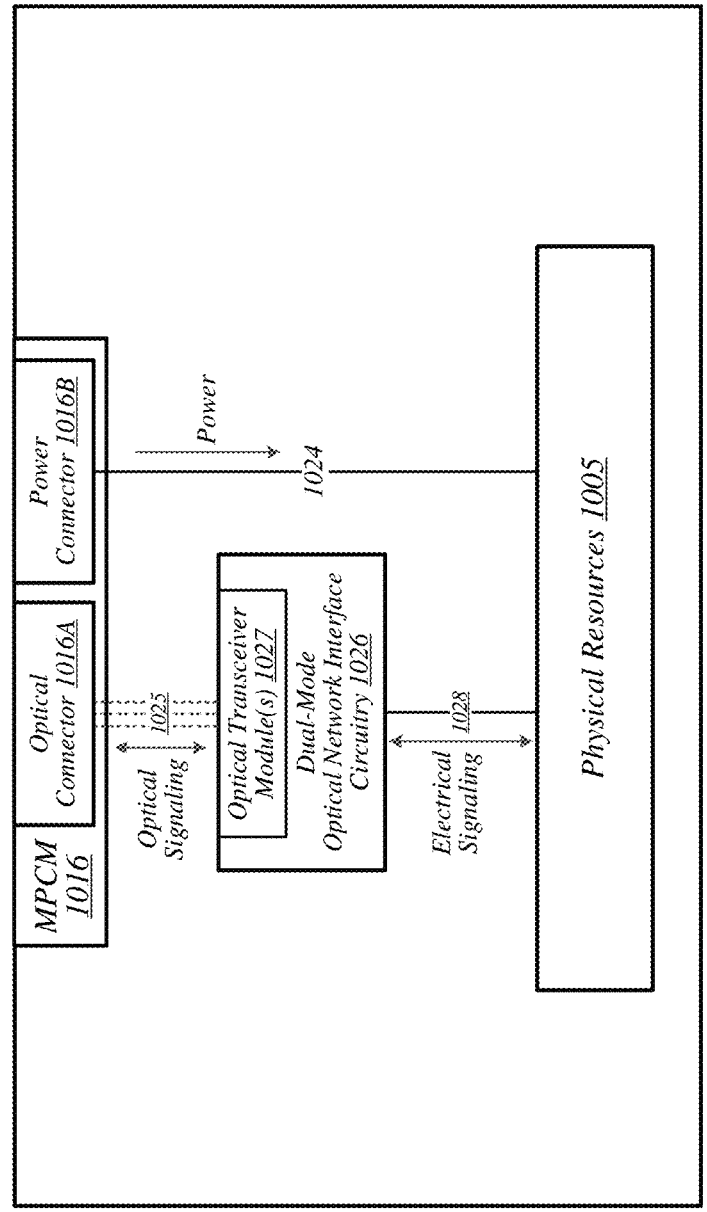
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
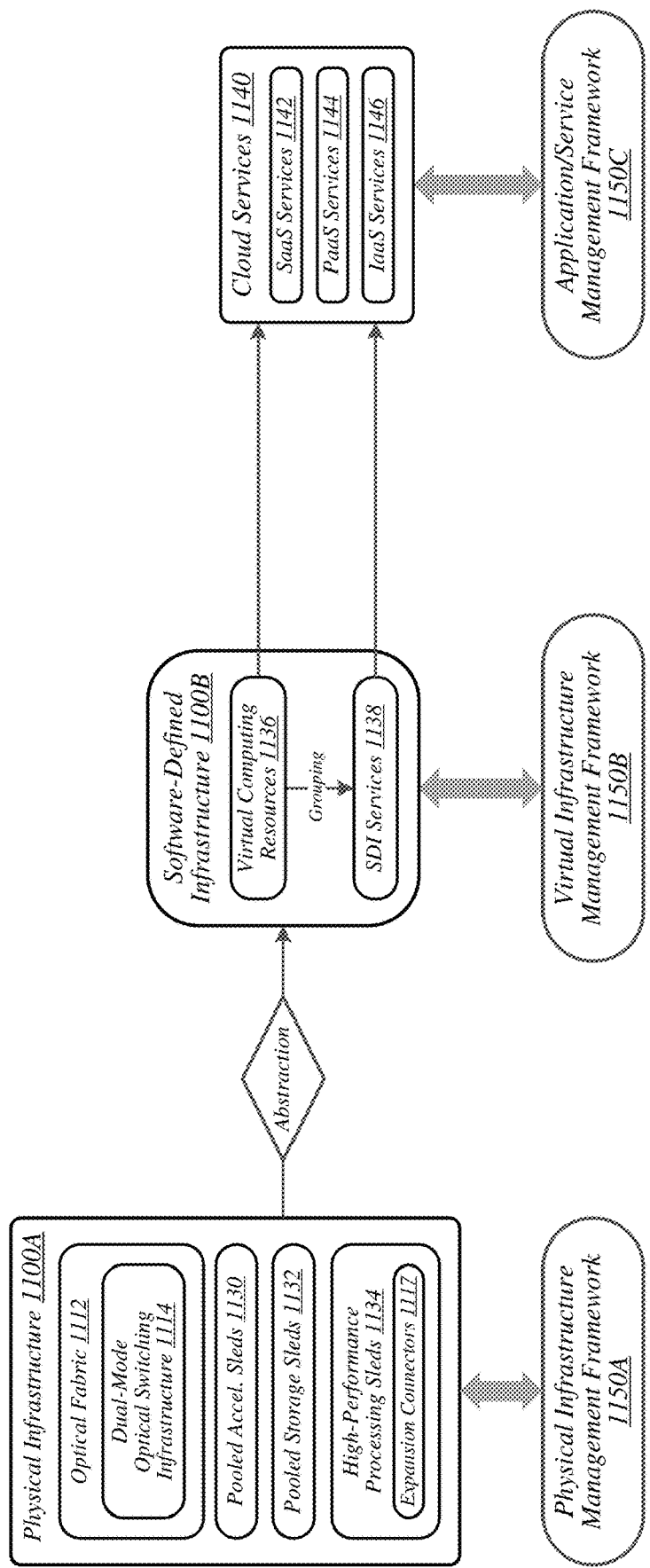
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide a QoS management capabilities for cloud services 1140. The embodiments are not limited in this context.

Figure 12:
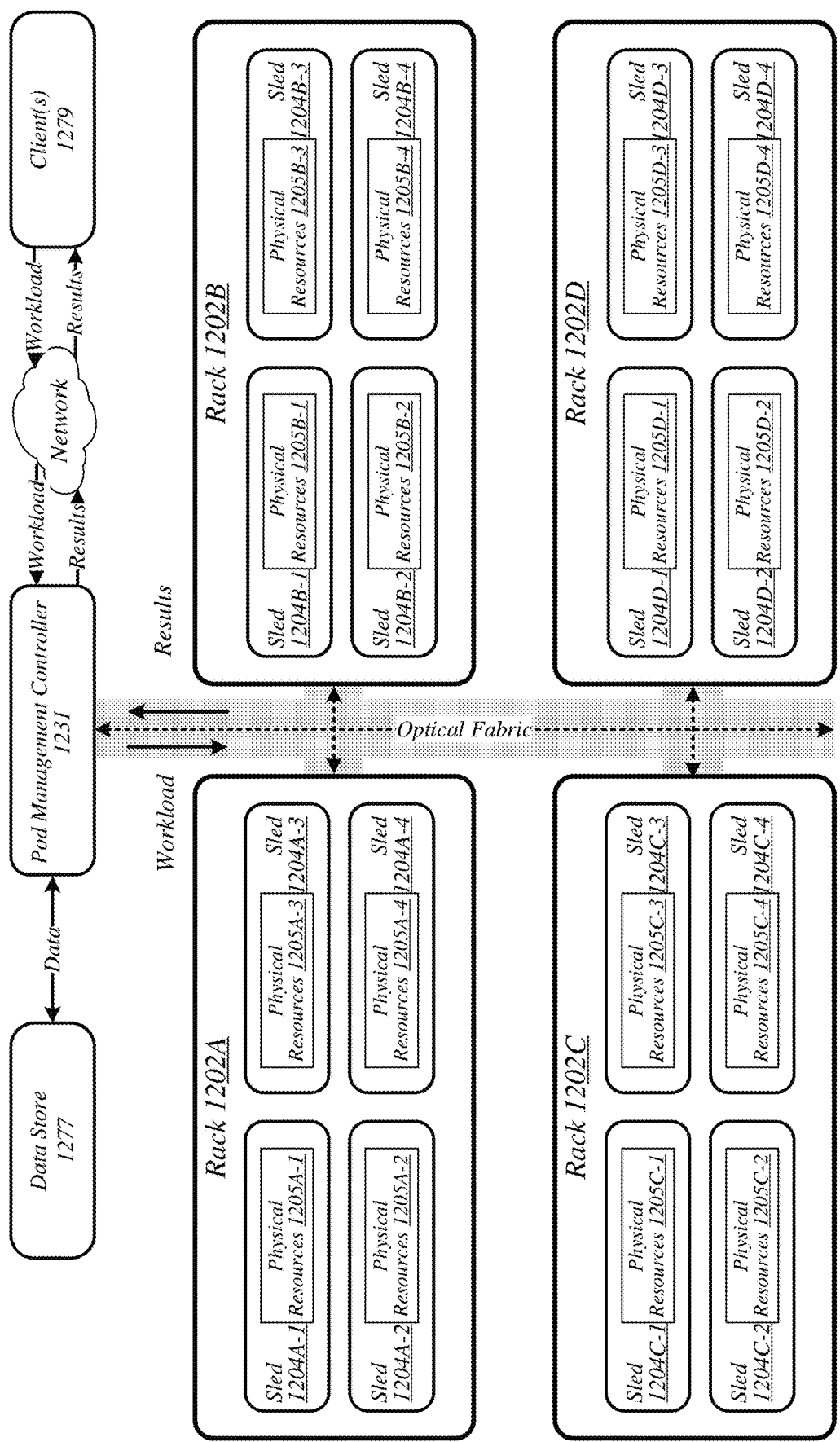
FIG. 12 illustrates an example of a data center.

FIG. 12 illustrates an example of a data center 1200 that may generally be representative of a data center or other type of computing network in/for which one or more techniques described herein may be implemented according to various embodiments. As shown in FIG. 12, the data center 1200 may be similar to and include features and components previously discussed. For example, the data center 1200 may generally contain a plurality of racks 1202A to 1202D, each of which may house computing equipment including a respective set of physical resources 1205A-x to 1205D-x, where x may be any positive integer from 1 to 4. The physical resources 1205 may be contained within a number of sleds 1204A through 1204D. As mentioned, the physical resources 1205 may include resources of multiple types, such as—for example—processors, co-processors, fully-programmable gate arrays (FPGAs), memory, accelerators, and storage. Moreover, the physical resources 1205 may be a physical memory resource, a physical compute resource, a physical storage resource, a physical accelerator resource, etc.

In embodiments, the physical resources 1205 may be pooled within racks and between racks. For example, physical resources 1205A-1 of sled 1204A-1 may be pooled with physical resources 1205A-3 of sled 1204A-3 to provide combined processing capabilities for workloads across sleds within the same rack, e.g. rack 1202A. Similarly, physical resources of one or more racks may be combined with physical resources of one or more other racks to create a pool of physical resources to process a workload. In one example, the physical resources 1205A-3 may be combined and pooled with physical resources of 1205B-1, which are located within rack 1202A and rack 102B, respectively. Any combination of physical resources 1205 may be pooled to process a workload and embodiments are not limited in this manner. Moreover, some embodiments may include more or less physical resources 1205, sleds 1204, and racks 1202 and the illustrated example should not be construed in a limiting manner.

In the illustrated example of FIG. 12, the data center 1200 may provide intelligent processing functionality to process workloads via the physical resources 1205. The intelligent processing capabilities may include, but are not limited to, determining physical resources, such as cores, memory, and I/O, to process a workload and configuring a circuit switch to group or combine a number of processing units in sockets to process the workload via dual paths of communication. For example, one or more requirements may be determined for workload, the requirements may specify processing requirements, memory requirements, I/O requirements, storage requirements, and so forth. Based on the requirements, a circuit switch may be configured to link or combine one or more processing units having cores, a memory controller, and I/O controller via dual paths of communciations. The combining of the one or more processing units may enable the requirements to be met by providing the apporiate physical resources 1205. Moreover, the processing units may be combined via electrical or optical dual paths of communications such that bandwidth is not reduced for communications between the processing units. The remaining processing units of physical compute resources, for example, may be used to process one or more other workloads in parallel, speeding up the total processing time for a number of workloads. Note that the processing units in embodiments discussed herein may be other processing elements, such as a computer processing unit (CPU), a processor, and so forth that is capable of being in a socket coupled via dual paths of communication. Embodiments are not limited to this example.

In embodiments, the data center 1200 may also include a pod management controller 1231, which may be capable of providing the intelligent functionality and causing one or more workloads to be processed by particular physical resources 1205 based on the needs and requirements of the workload. For example, one or more requirements may be stipulated in a service level agreement (SLA) for a workload. The SLA may be based on a policy-based management system to help evaluate and maintain an adequate level performance for a data center. The SLA may specify a set of one or more values or metrics relating to one or more specific, measurable performance characteristics and specifying one or more desired or required levels of service to be provided to a workload. Some requirements may include, latency, cost, protection against local failures or corruption, geographic dispersion, efficiency, throughput, processing times, etc. Thus, SLA requirements can be defined regarding any one or more of these characteristics and other characteristics. By collecting metric data and determining actual performance relative to an SLA, the pod management controller 1231 can determine whether a data center is performing adequately, and adjustments to the state of the data center can be made if it is not. For example, the pod management controller 1231 may adjust, send, cause, etc. which physical resources are processing particular tasks of workloads to ensure that the requirements of the SLA are being met. Moreover, the pod management controller 1231 may configure of cause the configuration of the processing units based on the needs of the workload. The SLA may specify processing requirements, such as processing time and processing cycles, required for a particular workload and the pod management controller 1231 may act accordingly.

In embodiments, the pod management controller 1231 may determine SLA requirements from data stored in a memory or storage, such as data store 1277. The SLA requirements may be stored in the data store 1277 based on user input or computer determinations specifying particular SLA requirements for workloads. Thus, a pod management controller 1231 may receive an indication of a workload to be processed by the data center 1200 from one or more clients 1279. The pod management controller 1231 can determine the SLA requirements for the workload based on the data in the data store 1277. For example, the pod management controller 1231 may perform a lookup and retrieve the SLA requirements for the workload based on an identifier identifying the workload.

The pod management controller 1231 may utilize the SLA requirements for the workload to determine which physical resources 1205 are to process one or more tasks of the workload and a configuration of for the physical resources 1205 and processing units. Further, the pod management controller 1231 may provide an indication to one or more sleds 1204 having the physical resources 1205 of a processing requirement for the workload. For example, the pod management controller 1231 may provide an indication that a workload requires two (2) processing units to process a workload. In another example, the pod management controller 1231 may provide an indication that a workload requires a particular amount of memory and based on the indication a circuit switch may be configured such that one or more processing units are combined to provide the particular amount of memory. In another example, the pod management controller 1231 may provide an indication that a workload requires a particular I/O throughput and based on the indication a circuit switch may be configured such that one or more processing units are combined to meet the I/O throughput. Embodiments are not limited by these examples.

The workloads may be communicated to the appropriate sleds 1204 via one or more network, such as an optical fiber network. In some instances, the workload may go through the pod management controller 1231. However, embodiments are not limited in this manner and some instances, the workload may be sent directly from a client to the appropriate sleds 1204 via a network, such as an optical fiber network.

As will be discussed in more detail, a sled 1204 may receive an indication to process a workload and one or more processing requirements for the workload. The sled 1204, and in particular, switching controller may configure a circuit switch to provide a number of processing units to process the workload based on the processing requirement(s). The processing requirement(s) may indicate a processing configuration to process the workload, a number of processing units, or a processing time in which the workload must be completed, a memory requirement to process the workload, an I/O requirement to process the workload, and so forth. The switching controller may determine a number of processing units to combine (if needed) based on the processing requirement(s). In some instances, the switching controller may set or configure the processing units based on the processing requirement(s) during a boot sequence of a sled 1204. In other instances, the configuration may be set in real-time or run-time. For example, the sleds 1204 may be providing a virtual environment to process the workloads and the processing unit configuration may be configured or set without requiring a reboot of an entire sled 1204. Embodiments are not limited in this manner.

Figure 13:
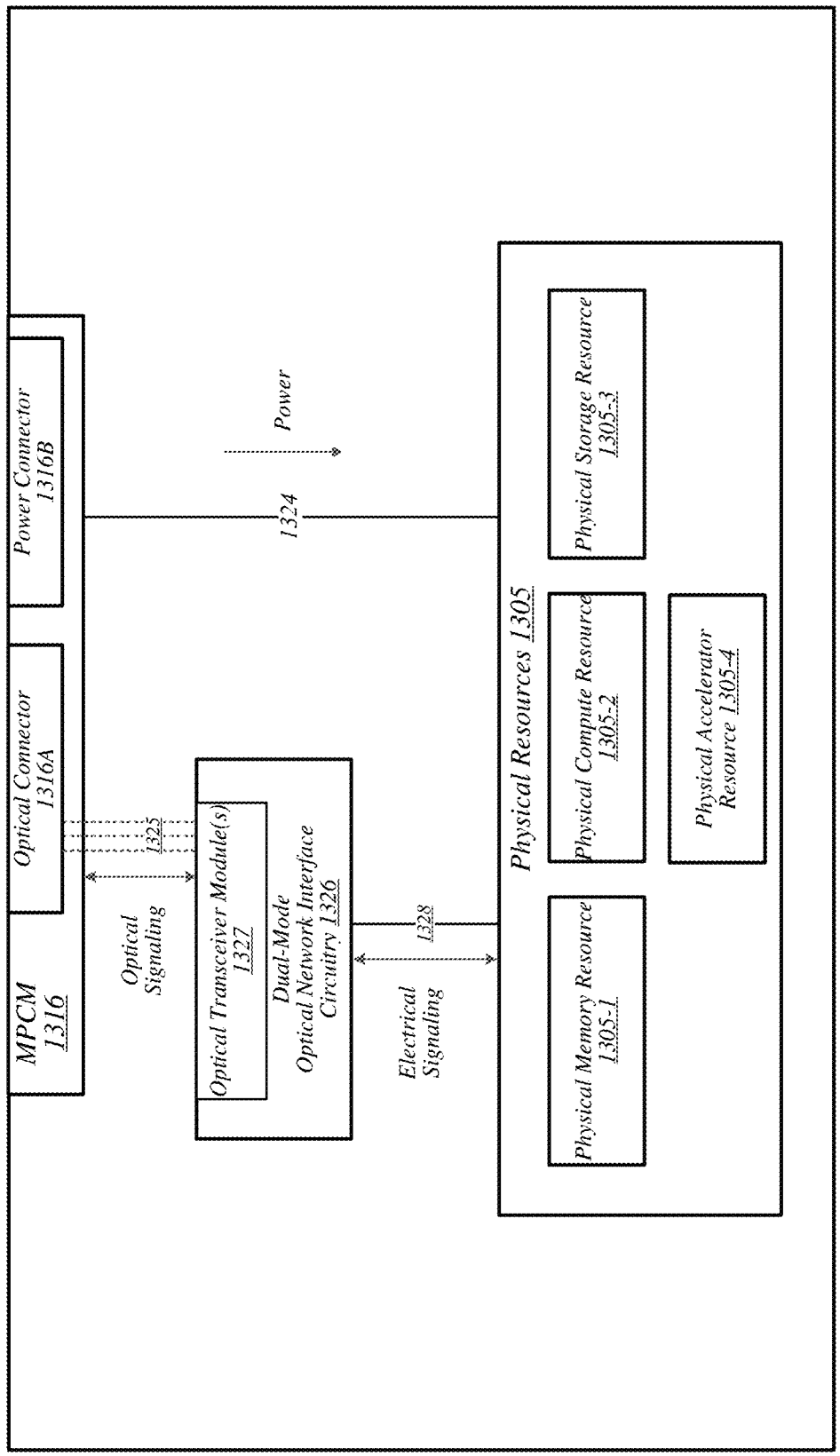
FIG. 13 illustrates an example of a sled.

FIG. 13 illustrates an example of a sled 1304 that may be representative of a sled designed for use in conjunction with the racks discussed herein, for example. In embodiments, sled 1304 may be similar to and have similar components and functionality as sled 1004 discussed in FIG. 10. Sled 1304 may feature an MPCM 1316 that which may include an optical connector 1316A, and a power connector 1316B, and that is designed to couple with a counterpart MPCM of a sled space in conjunction with insertion of MPCM 1316 into that sled space. Coupling MPCM 1316 with such a counterpart MPCM may cause power connector 1316B to couple with a power connector comprised in the counterpart MPCM. This may generally enable physical resources 1305 of sled 1304 to source power from an external source, via power connector 1316B and power transmission media 1324 that conductively couples power connector 1316B to physical resources 1305.

Sled 1304 may also include dual-mode optical network interface circuitry 1326. Dual-mode optical network interface circuitry 1326 may generally include circuitry that is capable of communicating over optical signaling media according to each of multiple link-layer protocols supported by dual-mode optical switching infrastructure, as previously discussed in FIGS. 9 and 10. In some embodiments, dual-mode optical network interface circuitry 1326 may be capable both of Ethernet protocol communications and of communications according to a second, high-performance protocol. In various embodiments, dual-mode optical network interface circuitry 1326 may include one or more optical transceiver modules 1327, each of which may be capable of transmitting and receiving optical signals over each of one or more optical channels. The embodiments are not limited in this context.

Coupling MPCM 1316 with a counterpart MPCM of a sled space in a given rack may cause optical connector 1316A to couple with an optical connector comprised in the counterpart MPCM. This may generally establish optical connectivity between optical cabling of the sled and dual-mode optical network interface circuitry 1326, via each of a set of optical channels 1325. Dual-mode optical network interface circuitry 1326 may communicate with the physical resources 1305 of sled 1304 via electrical signaling media 1328. Further, the dual-mode optical network interface circuitry 1326 may also couple with and communicate with other sleds, a pod management controller, and a rack management controller via optical connector 1316A and embodiments are not limited in this manner.

The sled 1304 may also include physical resources 1305, including but not limited to, a physical memory resource 1305-1, a physical compute resource 1305-2, a physical storage resource 1305-3, and a physical accelerator resource 1305-4. Embodiments are not limited in this manner.

A physical memory resource 1305-1 may be any type of memory, such as any machine-readable or computer-readable media capable of storing data, including both volatile and non-volatile memory. In some embodiments, the machine-readable or computer-readable medium may include a non-transitory medium. Moreover, physical memory resource 1305-1 may include in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. Embodiments are not limited to these examples.

A physical compute resource 1305-2 may be any type of circuitry capable of processing information. Moreover, a physical compute resources 1305-2 may be implemented using any processor or logic device. The physical compute resource 1305-2 may be one or more of any type of computational element, such as but not limited to, a processing core, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The physical compute resource 1305-2 may be connected to and communicate with the other physical resources 1305 of the computing system via an interconnect, such as one or more buses, control lines, and data lines.

In embodiments, the physical compute resource 1305-2 may include any number of processing units having a number of cores, e.g. two, four, eight, sixteen, thirty-two, etc., which may each be capable of processing one or more tasks or instructions of a workload. The processing units may also include a memory controller and an I/O controller. The memory controller may control and process read and write requests for memory and the processing unit. Further, the I/O controller may control I/O operations for various buses and interfaces and the processing unit. As will be discussed in more detail below, each of the processing units may be coupled with each other via electrical or optical dual paths of communication via a switch. The switch may enable grouping or combining a subset (or entire) number of processing units to process a workload. The switch may include circuit logic capable of configuring a circuit switch to link two or more processing units to process a workload based on processing requirement(s), for example.

In embodiments, the physical resources 1305 may also include a physical storage resource 1305-3 may be any type of storage, and may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, a physical storage resource 1305-3 may include technology to increase the storage performance enhanced protection for valuable digital media when multiple hard drives are included, for example. Further examples of physical storage resource 1305-3 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

The physical resources 1305 including a physical accelerator resource 1305-4 may be any type of accelerator device designed to increase processing power of a processor, such as the physical compute resource 1305-2. The physical accelerator resource 1305-4 accelerates transmission or processing beyond processor capabilities. In one example, a physical accelerator resource 1305-4 may compute faster floating-point units (FPUs) by assisting in math calculations or by increasing speed. In another example, the physical accelerator resource 1305-4 may be a graphics processing units (GPUs) for 3-D images or faster graphic displays. Embodiments, the physical accelerator resource 1305-4 may be implemented as field programmable gate arrays (FPGAs); however, embodiments are not limited in this manner.

Figure 14:
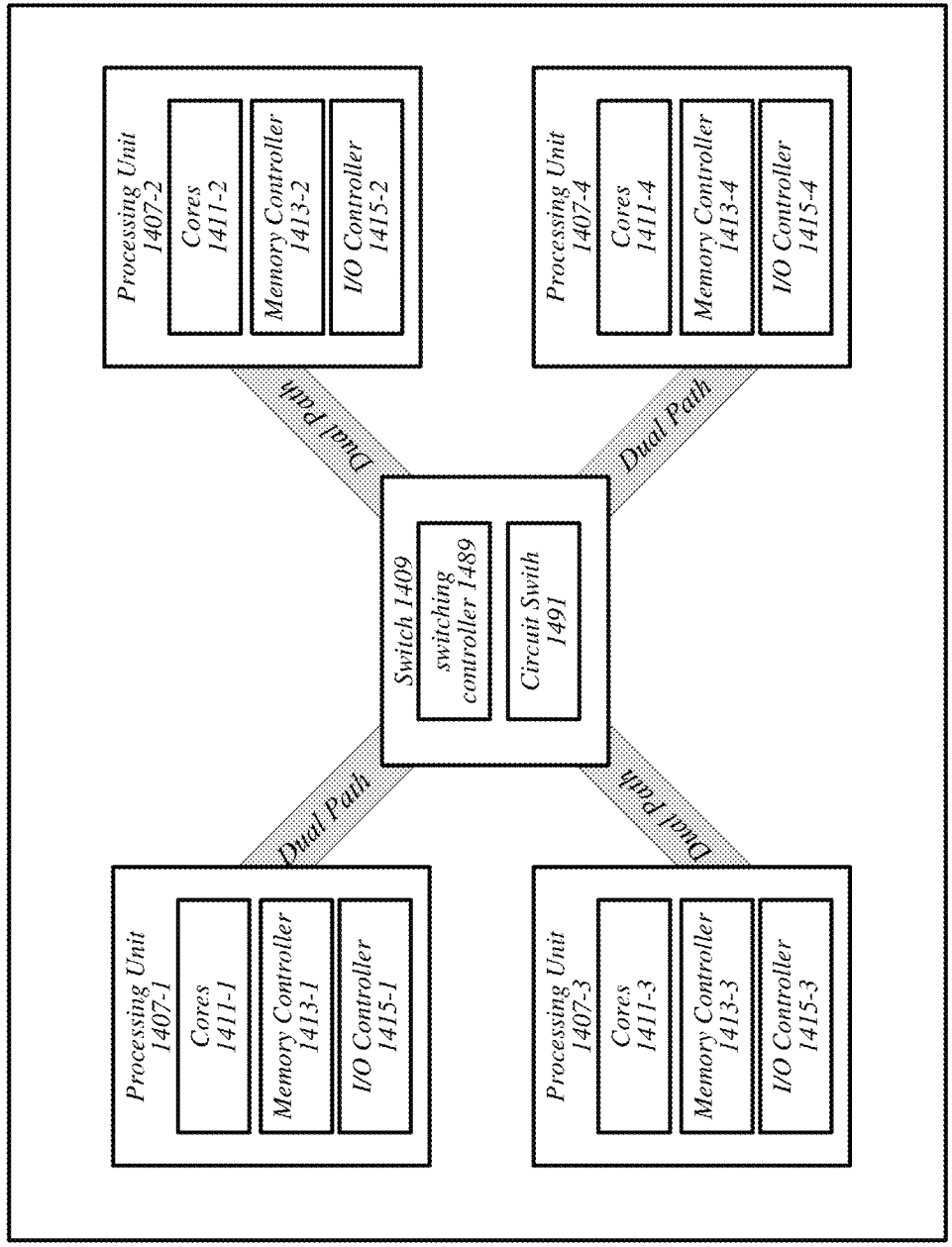
FIG. 14 illustrates an example of physical compute resources.

FIG. 14 illustrates an example of physical compute resources 1405-2 that may be representative of physical compute resources designed for use in conjunction with sleds and racks discussed herein. In embodiments, the physical compute resources 1405-2 may be similar to and have similar components and functionality as the physical compute resources 1305-2 discussed in FIG. 13. The physical compute resources 1405-2 may include a number of components and elements include processing units 1407-1 through 1407-4 and a switch 1409 including switching controller 1489 and a circuit switch 1491. Each of the processing units 1407 may also include cores 1411, a memory controller 1413, and a I/O controller 1415. Although FIG. 14 illustrates a physical compute resource 1405-2 including four processing units 1407-1 through 1407-4, embodiments are not limited in this manner. In embodiments, the switch 1409 may be implemented on the same die as the physical compute resource 1405-2 or may be coupled with them and provide a connection to each physical compute resource 1405-2 to provide south bridge functionality.

The processing unit 1407 including the cores 1411, the memory controller 1413, and the I/O controller 1415 may be implemented on a single die or, in some instances, one or more components may be implemented on different dies on a single chip package. For example, one or more of the memory controller 1413 and the I/O controller 1415 may be implemented on a different die in a single chip package. A processing unit 1407 may provide basic, and complex processing capabilities for the physical compute resources 1405-2 to process and execute instructions. Further, a processing unit 1407 including the cores 1411 can run a single or multiple (via hardware threading or Hyperthreading®) program context while maintaining the correct program state, registers, and correct execution order, and performing the operations through arithmetic logic units (ALUs). In embodiments, the processing units 1407 may be integrated onto a single integrated circuit die, or onto multiple dies in a single chip package. Note that although embodiments are discussed in reference to processing units, embodiments are not limited in this manner and concepts discussed herein can be applied to computer processing units (CPUs), and other processing elements/components.

In some embodiments, the processing units 1407 and their sockets may be coupled to each other via one or more dual paths of communications through switch 1409 and circuit switch 1491. The dual paths of communications may include electrical paths or optical paths, and the circuit switch 1491 may be an electrical switch or an optical switch, respectively. The circuit switch 1491 may be any type of electrical switch or optical switch to maintain the dual-paths of communication between the processing units 1407, e.g. a Flit switch or a FED switch. Note that in some instances, the dual paths of communication may include both electrical paths and optical paths and the circuit switch 1491 may include circuitry to switch both electrically and optically. The circuit switch 1491 may provide high speed switching with minimal delay.

As will be discussed in more detail below, the switching controller 1489 may be utilized to generate groups of one or more processing units 1407 based on processing requirements for a workload. Thus, other processing units 1407 may be excluded from the group to process the workload and are available to process another or different workload. Any number of groups of processing units 1407 may be generated by the switching controller 1489 to process workloads. The switching controller 1491 may also reassign or generate different groups of processing units 1407 to process another or different workload once it completes processing a current workload.

In some embodiments, the switching controller 1489 may receive an indication to process a workload and one or more processing requirements for the workload. In some instances, the processing requirements may include, a configuration arrangement of the processing units 1407, such as 4 socket, 2×2 socket, 4×1 socket, 2×1 socket, and 1×2 socket. The processing requirements may also generally define a number of processing units 1407 required to process the workload and the switching controller 1489 may determine the configuration of processing units 1407. In another example, the processing requirements may indicate an amount of time in which processing of the workload must be completed within and the switching controller 1489 may determine a number of processing units 1407 to assign to a workload based on the amount of time and a configuration. Thus, the switching controller 1489 may determine two or more processing units 1407 of a plurality of processing units 1407 to process a workload. In some instances, the processing requirements may specify an amount of memory required to process the workload. The switching controller 1489 may determine a number of processing units 1407 to combine based on the memory required and memory provided (coupled) with each processing unit 1407. In another example, the processing requirements may specify I/O throughput and the switching controller 1489 may determine a number of processing units 1407 to combine based which processing units 1407 are capable of meeting the requirement. Embodiments are not limited to these examples and other factors may go into determining the combination of the processing units 1407.

In embodiments, the switching controller 1489 may configure the circuit switch 1491 to link the two or more processing units 1407 to process the workload, the two or more processing units 1407 each linked to each other via dual paths of communication. Thus, the linked processing units 1407 may be able to communicate instructions, data, and other information between each other via the dual paths of communication. Thus, embodiments discussed herein do not run into single path or no redundant path (RAS) issues and provide increased throughput between the processor units. In some instances, the linked processing units 1407 may share common resources, such as caches and registers, and may communicate with these common resources via the dual paths of communications.

In embodiments, the switching controller 1489 may also be capable of reassigning one or more processing units 1407 to process a different workload. Thus, different groups of processing units 1407 may be configured to process different workloads based on the need or requirements of the workloads. Also, a sled and physical compute resources 1405-2 may be capable of processing more than one workload at a time. For example, a number of workloads may be processed in parallel. In one example, the number of processing units 1407 available for processing may be communicated to management controller and may be used to assign workloads to particular sleds/physical compute resources 1405-2. In some instances, the information may be communicated to a rack management controller or pod management controller via an out-of-band network, for example. Embodiments are not limited in this manner.

Figure 15:
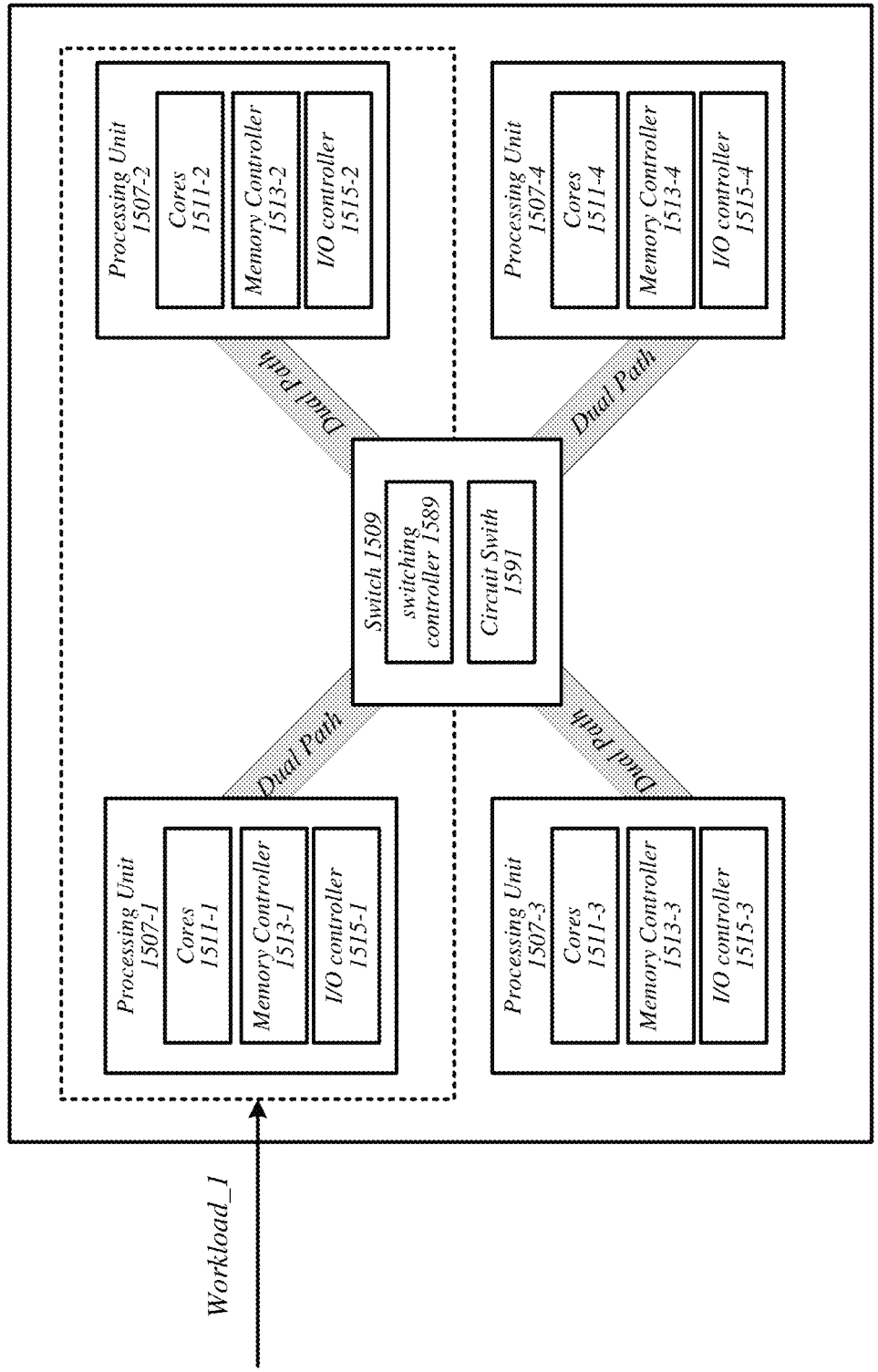
FIG. 15 illustrates an example of physical compute resources in a first example configuration.

FIG. 15 illustrates an example of a physical compute resource 1505-2 that may be representative of physical compute resources designed for use in conjunction with sleds and racks discussed herein, for example. In the illustrated example, the physical compute resources 1505-2 includes a number of components and elements, such as processing units 1507-1 through 1507-4 and a switch 1509 having switching controller 1589 and a circuit switch 1591. Although FIG. 15 illustrates the physical compute resources 1505-2 including four processing units 1507-1 through 1507-4, embodiments are not limited in this manner.

FIG. 15 illustrates one example configuration in which two processing units, 1507-1 and 1507-2, are grouped together to process a workload (Workload_1). In embodiments, the processing units 1507-1 and 1507-2 may be grouped or combined via switch 1509, and in particular circuit switch 1591, to process the workload based on the processing requirements of the workload. In embodiments, the switching controller 1589 may determine which and how many processing units 1507 are needed for the workload and cause the circuit switch 1591 to link or maintain a link between the processing units 1507 using dual paths of communications. Thus, in this example, processing units 1507-1 and 1507-2 may be able to communicate with each other via dual paths of communications through the switch 1509.

In this example, the remaining processing units 1507-3 and 1507-4 may be available for one or more other workloads to process on. Thus, the physical compute resources 1505-2 may notify a management controller a status or an availability of processing units 1507 to process additional workloads. This status or availability may be indicated in metric data, on a periodic or semi-periodic basis. Embodiments are not limited in this manner.

Figure 16:
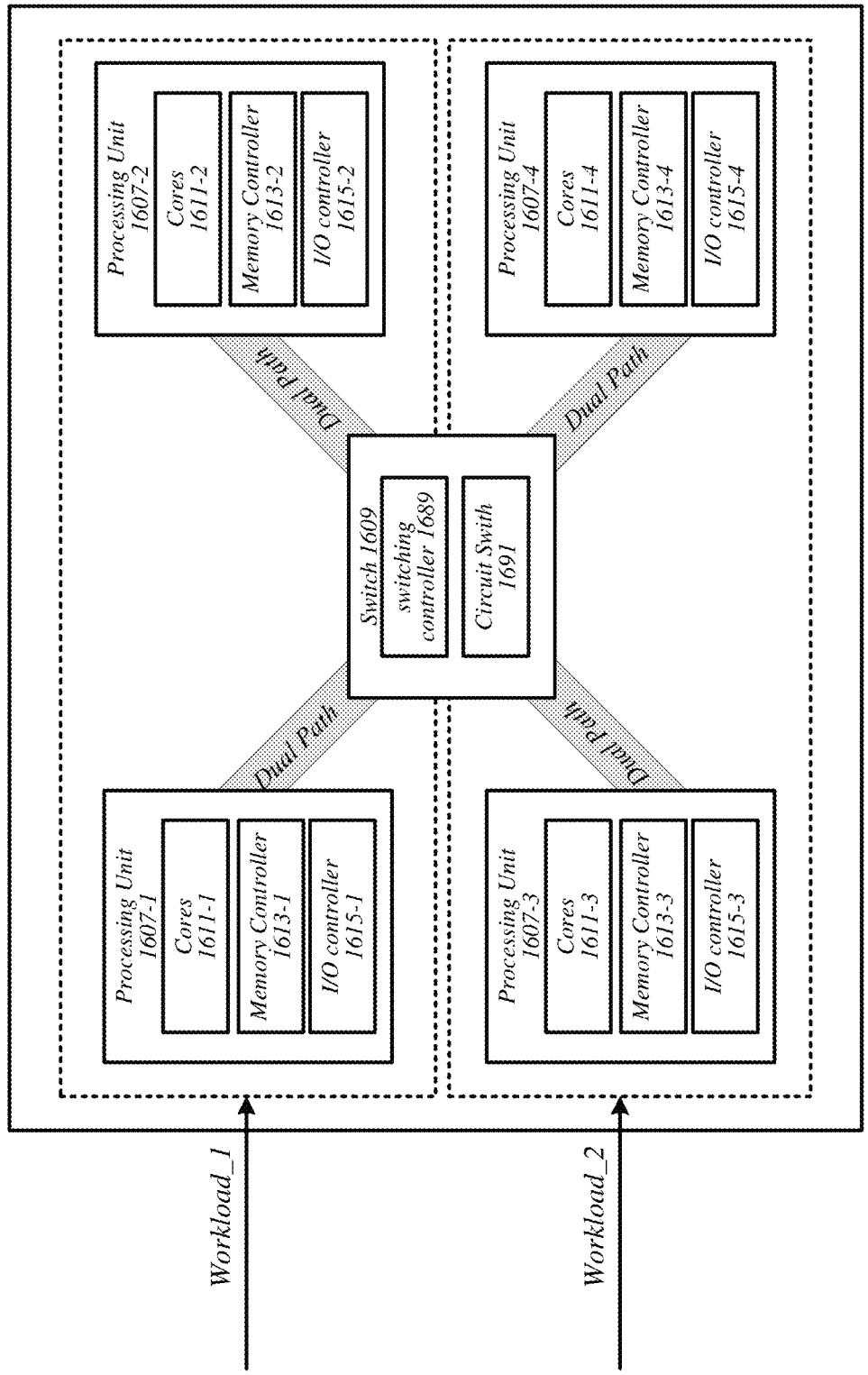
FIG. 16 illustrates an example of physical compute resources in a second example configuration.

FIG. 16 illustrates an example of physical compute resources 1605-2 that may be representative of physical compute resources designed for use in conjunction with sleds and racks discussed herein, for example. In the illustrated example, the physical compute resources 1605-2 includes a number of components and elements, such as processing units 1607-1 through 1607-4 and a switch 1609 having switching controller 1689 and a circuit switch 1691. Although FIG. 16 illustrates physical compute resources 1605-2 including four processing units 1607-1 through 1607-4, embodiments are not limited in this manner.

FIG. 16 illustrates one example configuration in which two processing units, 1607-1 and 1607-2, are grouped together to process a workload (Workload_1) and two different processing units, 1607-3 and 1607-4, are grouped together to process another workload (Workload_2). In embodiments, the processing units 1607-1 and 1607-2 may be grouped or combined via switch 1609, an in particular circuit switch 1691, to process the workload based on the processing requirements of the workload. Similarly, the processing units 1607-3 and 1607-4 may be grouped together to process the other workload based on the processing requirements of the other workload. Thus, in this example, processing units 1607-1 and 1607-2 may be able to communicate with each other via dual paths of communications through the switch 1609 and processing units 1607-3 and 1607-4 may be able to communicate with each other via dual paths of communications through switch 1609.

In the illustrated example, the dual paths of communication between processing units 1607-1 and 1607-2 and the dual paths of communications between processing units 1607-3 and 1607-4 may be electrically or optically isolated from each other via the circuit switch 1691. In other words, information communicated between processing units 1607-1 and 1607-2 will not be seen or detected by processing units 1607-3 and 1607-4. Similarly, information communicated between processing units 1607-3 and 1607-4 will not be seen or detected by processing units 1607-1 and 1607-2. That is, processing units 1607-1 and 1607-2 will communicate data through dual paths of communication links that are different from those that connect processing units 1607-3 and 1607-4. Therefore, processing units 1607-1 and 1607-2 are isolated from processing units 1607-3 and 1607-4, and vice versa.

Note that FIG. 16 illustrates only two groups of processing units 1607; however, embodiments are not limited in this manner. In addition, once a workload is complete, the processing units 1607 processing the workload are available to process another workload. The processing units 1607 may be reassigned in the same or different configuration. Embodiments are not limited in this manner.

Figure 17:
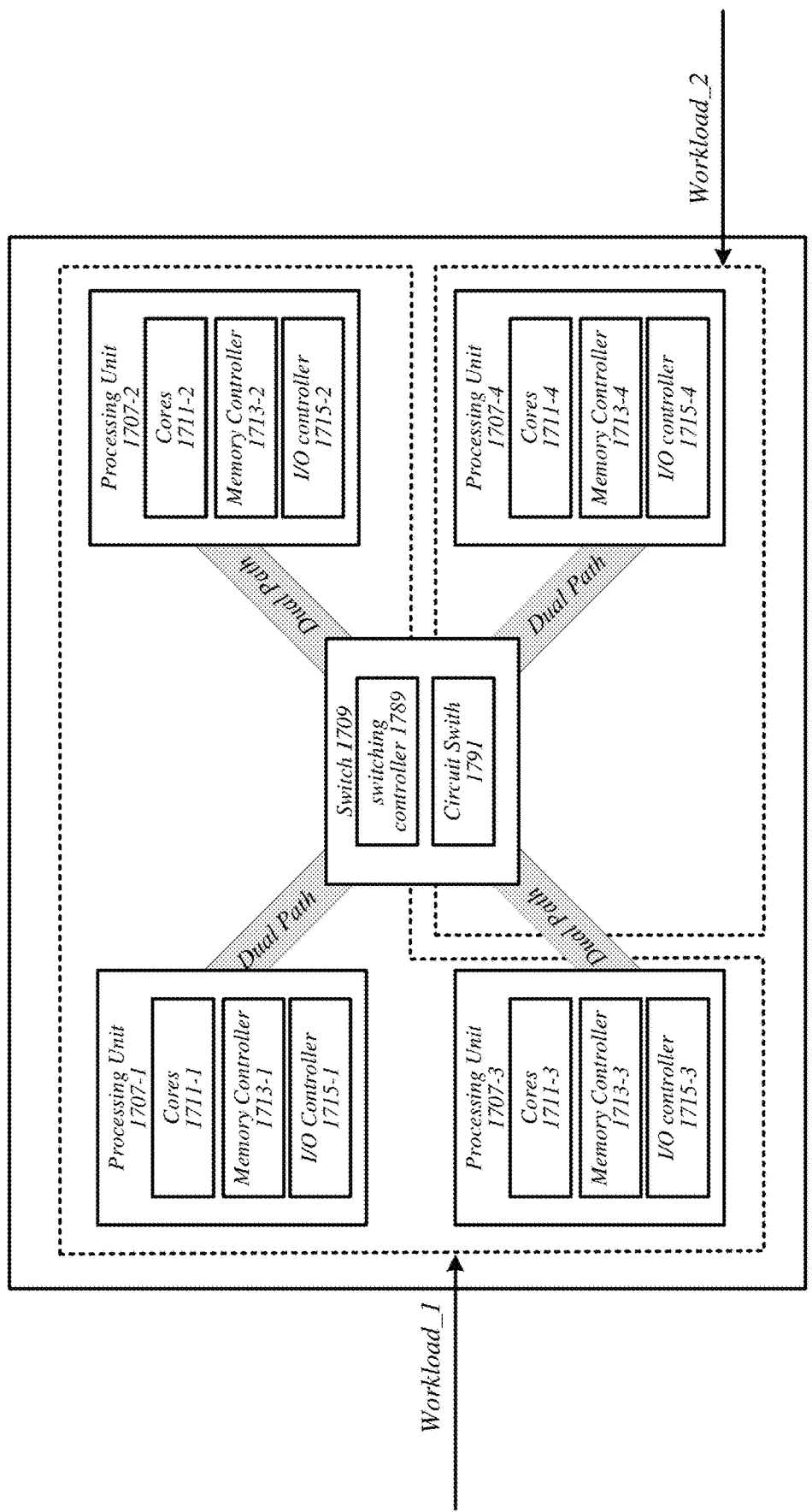
FIG. 17 illustrates an example of physical compute resources in a third example configuration.

FIG. 17 illustrates an example of physical compute resources 1705-2 that may be representative of a physical compute resource designed for use in conjunction with sleds and racks discussed herein, for example. In the illustrated example, the physical compute resource 1705-2 includes a number of components and elements, such as processing units 1707-1 through 1707-4 and a switch 1709 having switching controller 1789 and a circuit switch 1791. Although FIG. 17 illustrates a physical compute resource 1705-2 including four processing units 1707-1 through 1707-4, embodiments are not limited in this manner.

FIG. 17 illustrates one example configuration in which three processing units 1707-1, 1707-2, and 1707-3 are grouped together to process a workload (Workload_1) and a single processing unit 1707-4 is to process another workload (Workload_2). As similarly discussed above in FIG. 16, the processing units 1707-1, 1707-2, and 1707-3 may be grouped or combined via switch 1709, an in particular circuit switch 1791, to process the workload based on the processing requirements of the workload. Thus, in this example, the processing units 1707-1, 1707-2, and 1707-3 may be able to communicate with each other via dual paths of communications through the switch 1709 and circuit switch 1791. Moreover, a dual path of communication may be established or maintained between each of the other processing units. Thus, in this example, a dual path of communication may be between processing units 1707-1 and 1707-2, between 1707-1 and 1707-3, and between 1707-2 and 1707-3. Note that the dual paths of communication may be maintained between each of the processing units 1707 having any number of processing units 1707.

In the illustrated example, processing unit 1707-4 is configured such that it processes another workload (Workload_2). As previously discussed, the three processing units 1707-1, 1707-2, and 1707-3 may be electrically or optically isolated from processing unit 1707-4 via the circuit switch 1791. In other words, information communicated between processing units 1707-1, 1707-2, and 1707-3 will not be seen or detected by processing unit 1707-4.

Figure 18:
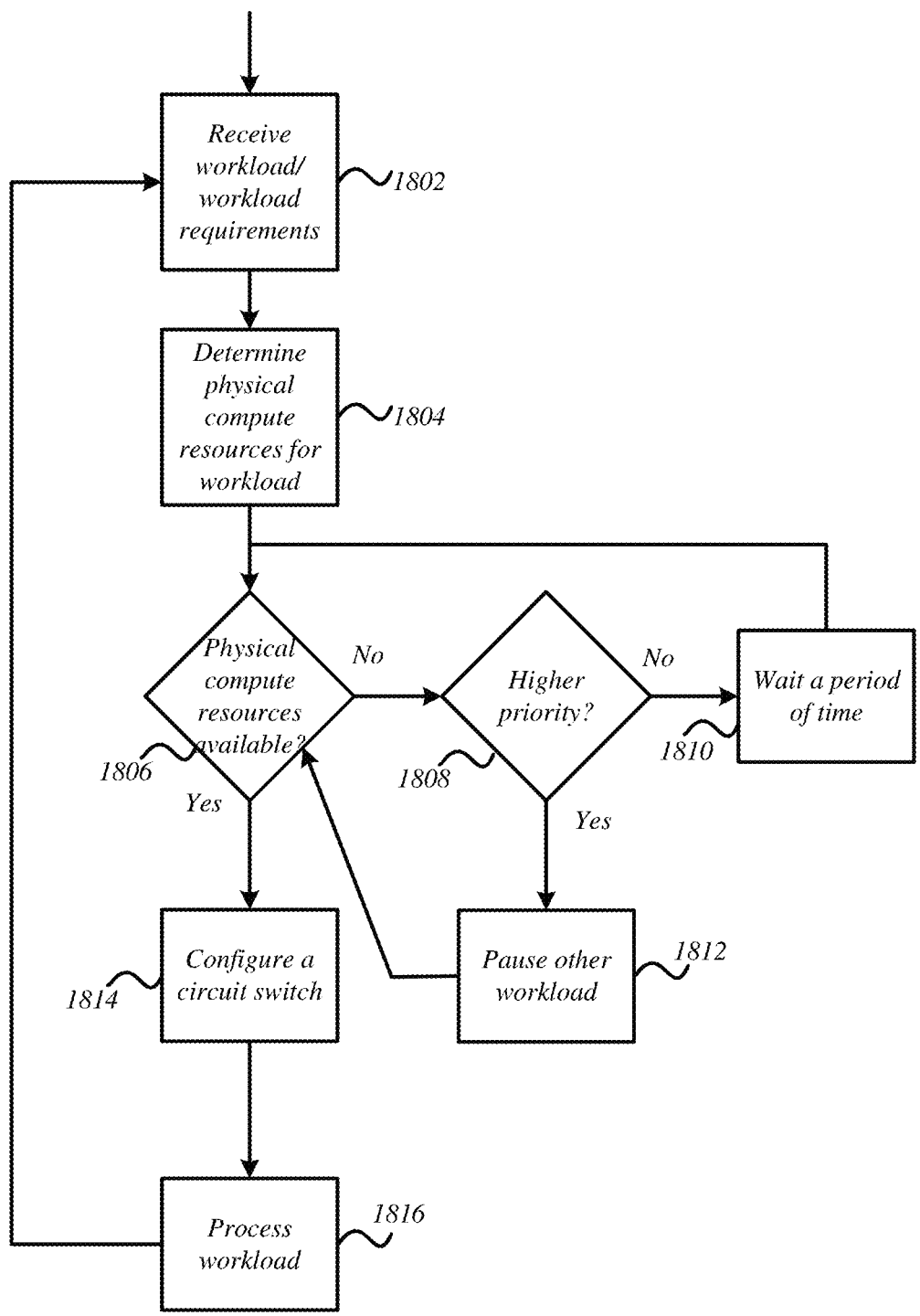
FIG. 18 illustrates an example of a first logic flow.

FIG. 18 illustrates an embodiment of logic flow 1800. The logic flow 1800 may be representative of some or all of the operations executed by one or more embodiments described herein. For example, the logic flow 1800 may illustrate operations performed by a physical compute resource and switching controller, as discussed herein. However, embodiments are not limited in this, and one or more operations may be performed by other components or systems discussed herein.

At block 1802, the logic flow 1800 may include receiving one or more of a workload, an indication of a workload, and one or more processing requirements for a workload. In some embodiments, the workload, the indication, and the requirement(s) may be received from a pod management controller managing a number of racks or a rack management controller managing of a single rack. Embodiments are not limited in this context.

At block 1804, embodiments include determining a number of processing units to process the workload. The number of processing units may be based on a processing requirement for the workload. For example, the processing requirement may include a configuration for the processing units, a time in which the workload processing must be complete, a specified number of processing units to process the workload, a memory requirement, a I/O requirement, or any other requirement that may be specified in an SLA.

At block 1806, the logic flow 1800 may include determining whether the number of processing units are available to process the workload. If at block 1806, the number of processing units is available to process the workload, a circuit switch may be configured such that the processing units to process the workload are linked via dual paths of communication between each other at block 1814. Further and at block 1816, the workload may be processed by the processing units.

If at block 1806, the number of processing units is not available, a determination may be made as to whether the new (just received) workload has a higher priority than any other workload currently being processed by processing units at block 1808. If not, the logic flow 1800 may include waiting a period of time at block 1810 and repeating decision block 1806 until a number of processing units is available. The period of time may be user or computer configured and may be any amount of time or a typical amount of time in which a workload may be processed in. In instances, the logic may include notifying the pod management controller that it cannot process the workload and the workload may be processed by different physical compute resources.

If at block 1808 the new workload has a higher priority than a current workload, embodiments may include pausing the current workload at block 1812. In other words, the processing of the current workload may be paused to free one or more processing units for the new workload. The logic flow 1800 may include determining whether freeing the one or more processing units provides enough processing units at decision 1806. The logic flow 1800 may continue until the workload is processed and for processing any number of additional workloads.

Figure 19:
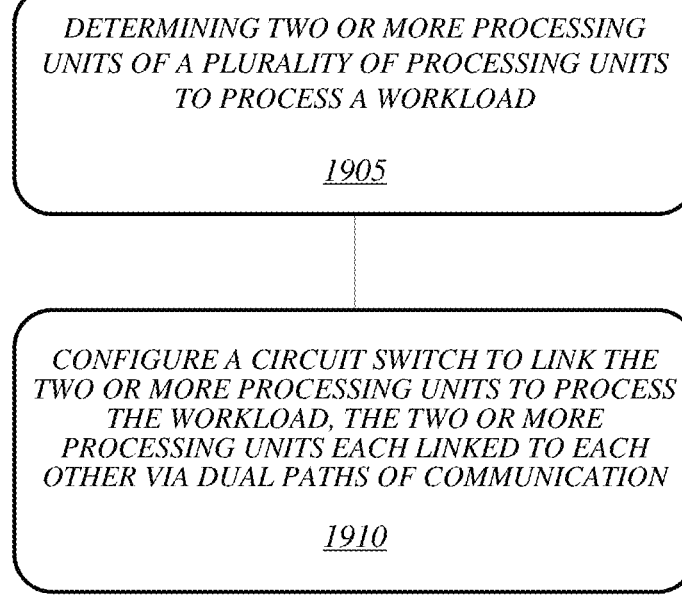
FIG. 19 illustrates an example of a second logic flow.

FIG. 19 illustrates an embodiment of logic flow 1900. The logic flow 1900 may be representative of some or all of the operations executed by one or more embodiments described herein. For example, the logic flow 1900 may illustrate operations performed by switching controller, as discussed herein. However, embodiments are not limited in this, and one or more operations may be performed by other components or systems discussed herein.

At block 1905, the logic flow 1900 includes determining two or more processing units of a plurality of processing units to process a workload. As previously discussed, the determination may be based on one or more processing requirement(s) and SLA for the workload. In some instances, the number and/or configuration of processing units to process workloads may be provided to the switching controller.

At block 1910, the logic flow 1900 includes configuring a circuit switch to link the two or more processing units to process the workload, the two or more processing units each linked to each other via dual paths of communication. In embodiments, the circuit switch may be an electrical circuit switch and the dual paths of communication may be electrical paths of communication. In the same or other embodiments, the circuit switch may be an optical circuit switch and the dual paths of communication may be optical paths of communication. Embodiments are not limited in this manner.

The detailed disclosure now turns to providing examples that pertain to further embodiments. Examples one through six (1-6) provided below are intended to be exemplary and non-limiting.

In a first example, a system, a device, an apparatus, and so forth may include switching controller coupled to a plurality of processing units, the switching controller to determine two or more processing units of the plurality of processing units to process a workload, and configure a circuit switch to link the two or more processing units to process the workload, the two or more processing units each linked to each other via dual paths of communication.

In a second example and in furtherance of the first example, a system, a device, an apparatus, and so forth including the switching controller to determine the two or more processing units based on a processing requirement for the workload indicating one or more of a number of processing units required to process the workload, a configuration of processing units to process the workload, a memory requirement to process the workload, an input/output (I/O) requirement to process the workload, and an amount of time in which workload must be processed.

In a third example and in furtherance of any of the previous examples, a system, a device, an apparatus, and so forth including the switching controller to determine two or more different processing units of the plurality of processing units to process a different workload, and configure the circuit switch to link the two or more different processing units to process the different workload.

In a fourth example and in furtherance of any of the previous examples, a system, a device, an apparatus, and so forth including the switching controller to determine the two or more different processing units based on a different processing requirement for the different workload, and isolate the two or more processing units from the two or more different processing units via the links.

In a fifth example and in furtherance of any of the previous examples, a system, a device, an apparatus, and so forth including the circuit switch comprising an electrical circuit switch and the dual paths each comprising an electrical path.

In a sixth example and in furtherance of any of the previous examples, a system, a device, an apparatus, and so forth including the circuit switch comprising an optical circuit switch and the dual paths each comprising an optical path.

In a seventh example and in furtherance of any of the previous examples, a system, a device, an apparatus, and so forth including the switching controller to configure the two or more processing units based on the workload having a higher priority than a different workload.

In an eighth example and in furtherance of any of the previous examples, a system, a device, an apparatus, and so forth including the switching controller to reconfigure the two or more processing units to process a different workload upon completion of processing the workload.

In a ninth example and in furtherance of any of the previous examples, a system, a device, an apparatus, and so forth including a plurality of processing units comprising cores, a memory controller, and a input/output (I/O) controller.

In a tenth example and in furtherance of any of the previous examples, a non-transitory computer-readable storage medium, comprising a plurality of instructions, that when executed, enable processing circuitry to determine two or more processing units of a plurality of processing units to process a workload, and configure a circuit switch to link the two or more processing units to process the workload, the two or more processing units each linked to each other via dual paths of communication.

In an eleventh example and in furtherance of any of the previous examples, a non-transitory computer-readable storage medium, comprising a plurality of instructions, that when executed, enable processing circuitry to determine the two or more processing units based on a processing requirement for the workload indicating one or more of a number of processing units required to process the workload, a configuration of processing units to process the workload, a memory requirement to process the workload, an input/output (I/O) requirement to process the workload, and an amount of time in which workload must be processed.

In a twelfth example and in furtherance of any of the previous examples, a non-transitory computer-readable storage medium, comprising a plurality of instructions, that when executed, enable processing circuitry to determine two or more different processing units of the plurality of processing units to process a different workload, and configure the circuit switch to link the two or more different processing units to process the different workload.

In a thirteenth example and in furtherance of any of the previous examples, a non-transitory computer-readable storage medium, comprising a plurality of instructions, that when executed, enable processing circuitry to determine the two or more different processing units based on a different processing requirement for the different workload, and isolate the two or more processing units from the two or more different processing units via the links.

In a fourteenth example and in furtherance of any of the previous examples, a non-transitory computer-readable storage medium, comprising a plurality of instructions, that when executed, enable processing circuitry to process using the circuit switch comprising an electrical circuit switch and the dual paths each comprising an electrical path.

In a fifteenth example and in furtherance of any of the previous examples, a non-transitory computer-readable storage medium, comprising a plurality of instructions, that when executed, enable processing circuitry to process using the circuit switch comprising an optical circuit switch and the dual paths each comprising an optical path.

In a sixteenth example and in furtherance of any of the previous examples, a non-transitory computer-readable storage medium, comprising a plurality of instructions, that when executed, enable processing circuitry to configure the two or more processing units based on the workload having a higher priority than a different workload.

In a seventeenth example and in furtherance of any of the previous examples, a non-transitory computer-readable storage medium, comprising a plurality of instructions, that when executed, enable processing circuitry to reconfigure the two or more processing units to process a different workload upon completion of processing the workload.

In an eighteenth example and in furtherance of any of the previous examples, a computer-implemented method may include determining two or more processing units of a plurality of processing units to process a workload, and configuring a circuit switch to link the two or more processing units to process the workload, the two or more processing units each linked to each other via dual paths of communication.

In a nineteenth example and in furtherance of any of the previous examples, a computer-implemented method may include determining the two or more processing units based on a processing requirement for the workload indicating one or more of a number of processing units required to process the workload, a configuration of processing units to process the workload, a memory requirement to process the workload, an input/output (I/O) requirement to process the workload, and an amount of time in which workload must be processed.

In a twentieth example and in furtherance of any of the previous examples, a computer-implemented method may include determining two or more different processing units of the plurality of processing units to process a different workload, and configuring the circuit switch to link the two or more different processing units to process the different workload.

In a twenty-first example and in furtherance of any of the previous examples, a computer-implemented method may include determining the two or more different processing units based on a different processing requirement for the different workload, and isolating the two or more processing units from the two or more different processing units via the links.

In a twenty-second example and in furtherance of any of the previous examples, a computer-implemented method may include processing using the circuit switch comprising an electrical circuit switch and the dual paths each comprising an electrical path.

In a twenty-third example and in furtherance of any of the previous examples, a computer-implemented method may include processing using the circuit switch comprising an optical circuit switch and the dual paths each comprising an optical path.

In a twenty-fourth example and in furtherance of any of the previous examples, a computer-implemented method may include configuring the two or more processing units based on the workload having a higher priority than a different workload.

In a twenty-fifth example and in furtherance of any of the previous examples, a computer-implemented method may include reconfiguring the two or more processing units to process a different workload upon completion of processing the workload.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are at this moment incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture? It is, of course, not possible to describe every conceivable combination of components and methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:
1. An apparatus, comprising:
a circuit switch; and
a switching controller to:
  link two or more accelerators to process a first workload to be received via a first path of communication through the circuit switch, the first path of communication based on a partitioned circuit switch topology that isolates the two or more accelerators from at least one other accelerator, the at least one other accelerator to process a second workload to be received via a second path of communication through the circuit switch;
  unlink an accelerator from among the two or more accelerators for the accelerator to process a third workload, the accelerator unlinked based on a different processing requirement for the third workload;

configure the circuit switch to enable the accelerator to receive the third workload via a third path of communication through the circuit switch; and isolate the accelerator from the two or more accelerators based on the partitioned circuit switch topology.

2. The apparatus of claim 1, the switching controller to link the two or more accelerators based on a processing requirement for the first workload, a configuration of accelerators to process the first workload, a memory requirement to process the first workload, an input/output requirement to process the first workload, or an amount of time in which the first workload must be processed.

3. The apparatus of claim 1, wherein the circuit switch comprises an electrical circuit switch.

4. The apparatus of claim 1, wherein the circuit switch comprises an optical circuit switch.

5. The apparatus of claim 1, the switching controller to link the two or more accelerators based on the first workload having a higher priority than a different workload.

6. The apparatus of claim 1, the switching controller to reconfigure the circuit switch such that the two or more accelerators process a different workload received via the first path of communication upon completion of processing the first workload.

7. The apparatus of claim 1, the two or more accelerators or the at least one other accelerator comprising a graphics processing unit (GPU) or a field programmable gate array (FPGA).

8. A non-transitory computer-readable storage medium, comprising a plurality of instructions, that when executed, enable processing circuitry to:

select two or more accelerators to link;

configure a circuit switch to link the two or more accelerators to process a first workload that is to be received via a first path of communication through the circuit switch, the first path of communication based on a partitioned circuit switch topology that isolates the two or more accelerators from at least one other accelerator, the at least one other accelerator to process a second workload to be received via a second path of communication through the circuit switch;

unlink an accelerator from among the two or more accelerators for the accelerator to process a third workload, the accelerator unlinked based on a different processing requirement for the third workload;

configure the circuit switch to enable the accelerator to receive the third workload via a third path of communication through the circuit switch; and isolate the accelerator from the two or more accelerators based on the partitioned circuit switch topology.

9. The non-transitory computer-readable storage medium of claim 8, comprising a plurality of instructions, that when executed, enable processing circuitry to select the two or more accelerators based on a processing requirement for the first workload, a configuration of accelerators to process the first workload, a memory requirement to process the first workload, an input/output requirement to process the first workload, or an amount of time in which the first workload must be processed.

10. The non-transitory computer-readable storage medium of claim 8, wherein the circuit switch comprises an electrical circuit switch.

11. The non-transitory computer-readable storage medium of claim 8, wherein the circuit switch comprises an optical circuit switch.

12. The non-transitory computer-readable storage medium of claim 8, comprising a plurality of instructions, that when executed, enable processing circuitry to link the two or more accelerators based on the first workload having a higher priority than a different workload.

13. The non-transitory computer-readable storage medium of claim 8, comprising a plurality of instructions, that when executed, enable processing circuitry to reconfigure the circuit switch such that the two or more accelerators process a different workload received via the first path of communication upon completion of processing the first workload.

14. A computer-implemented method, comprising:

selecting two or more accelerators to link;

configuring a circuit switch to link the two or more accelerators to process a first workload that is to be received via a first path of communication through the circuit switch, the first path of communication based on a partitioned circuit switch topology that isolates the two or more accelerators from at least one other accelerator, the at least one other accelerator to process a second workload to be received via a second path of communication through the circuit switch;

unlinking an accelerator from among the two or more accelerators for the accelerator to process a third workload, the accelerator unlinked based on a different processing requirement for the third workload;

configuring the circuit switch to enable the accelerator to receive the third workload via a third path of communication through the circuit switch; and isolating the accelerator from the two or more accelerators based on the partitioned circuit switch topology.

15. The computer-implemented method of claim 14, comprising selecting the two or more accelerators based on a processing requirement for the first workload, a configuration of accelerators to process the first workload, a memory requirement to process the first workload, an input/output requirement to process the first workload, or an amount of time in which the first workload must be processed.

16. The computer-implemented method of claim 14, wherein the circuit switch comprises an electrical circuit switch.

17. The computer-implemented method of claim 14, wherein the circuit switch comprises an optical circuit switch.

18. The computer-implemented method of claim 14, comprising linking the two or more accelerators based on the first workload having a higher priority than a different workload.

19. The computer-implemented method of claim 14, comprising reconfiguring the circuit switch such that the two or more accelerators process a different workload received via the first path of communication upon completion of processing the first workload.

20. The computer-implemented method of claim 14, the two or more accelerators comprising at least one of the two or more accelerators to be coupled with a memory device to facilitate processing of the first workload.

21. The apparatus of claim 1, the two or more accelerators comprising at least one of the two or more accelerators to be coupled with a memory device to facilitate processing of the first workload.

22. The apparatus of claim 21, comprising the at least one of the two or more accelerators to be coupled with the memory device to enable a central processing unit that couples with the circuit switch to access the memory device through the circuit switch in order to facilitate processing of the first workload.

23. The apparatus of claim 1, the two or more accelerators comprising at least one of the two or more accelerators to be coupled with an input/output controller device to facilitate processing of the first workload.

24. The apparatus of claim 23, comprising the at least one of the two or more accelerators to be coupled with the input/output controller device to enable a central processing unit that couples with the circuit switch to access the input/output controller device through the circuit switch in order to facilitate processing of the first workload.

25. The non-transitory computer-readable storage medium of claim 8, the two or more accelerators comprising at least one of the two or more accelerators to be coupled with a memory device to facilitate processing of the first workload.

* * * * *